Figure 1:
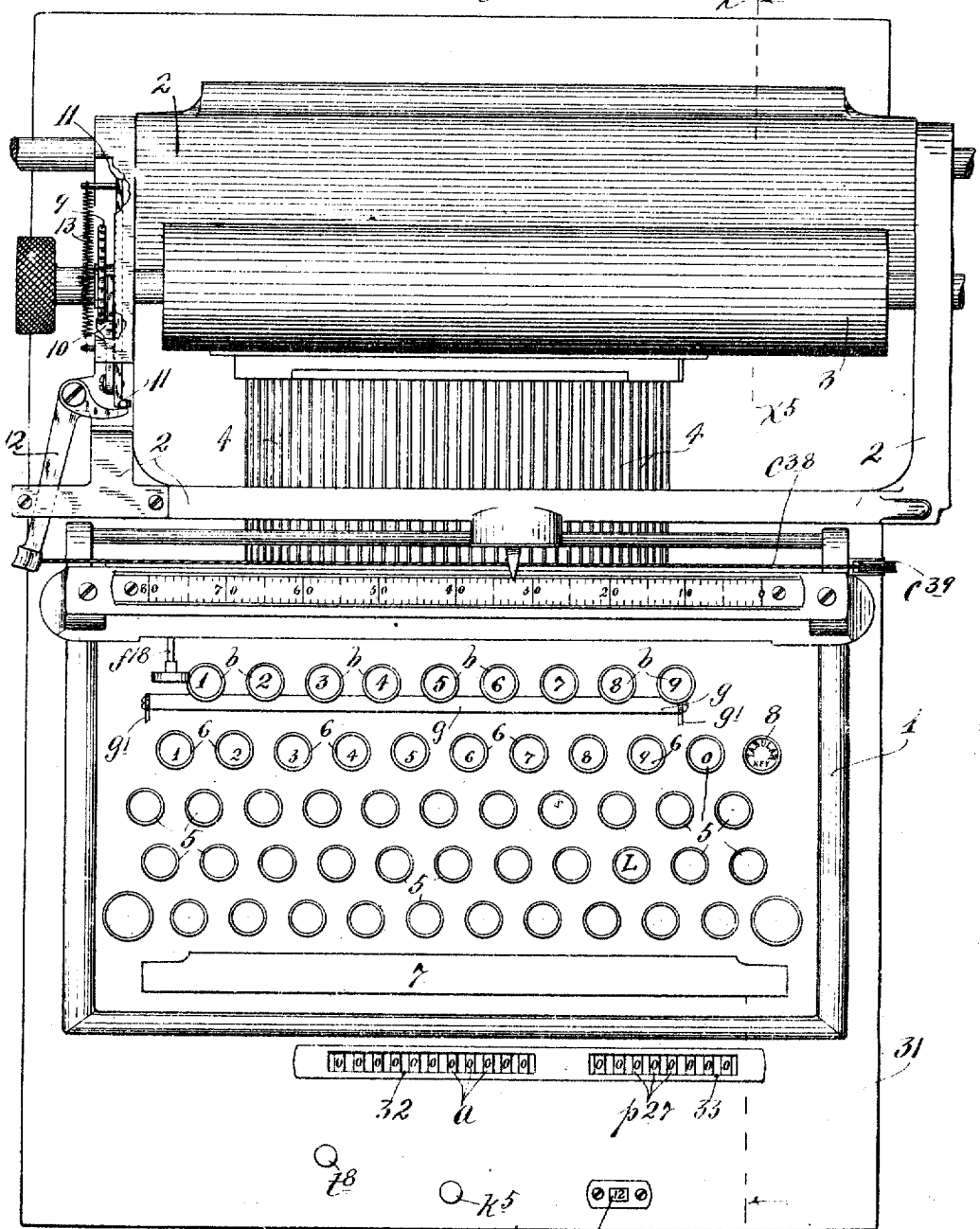

H. HANSON.
COMBINED TYPE WRITING AND COMPUTING MACHINE.
APPLICATION FILED AUG. 30, 1905.

905,421.

Patented Dec. 1, 1908.
24 SHEETS—SHEET 1.

Witnesses.
A. H. Opsahl.
E. W. Jeppesen.

Inventor.
Hans Hanson
By his Attorney
Williamson Merchant

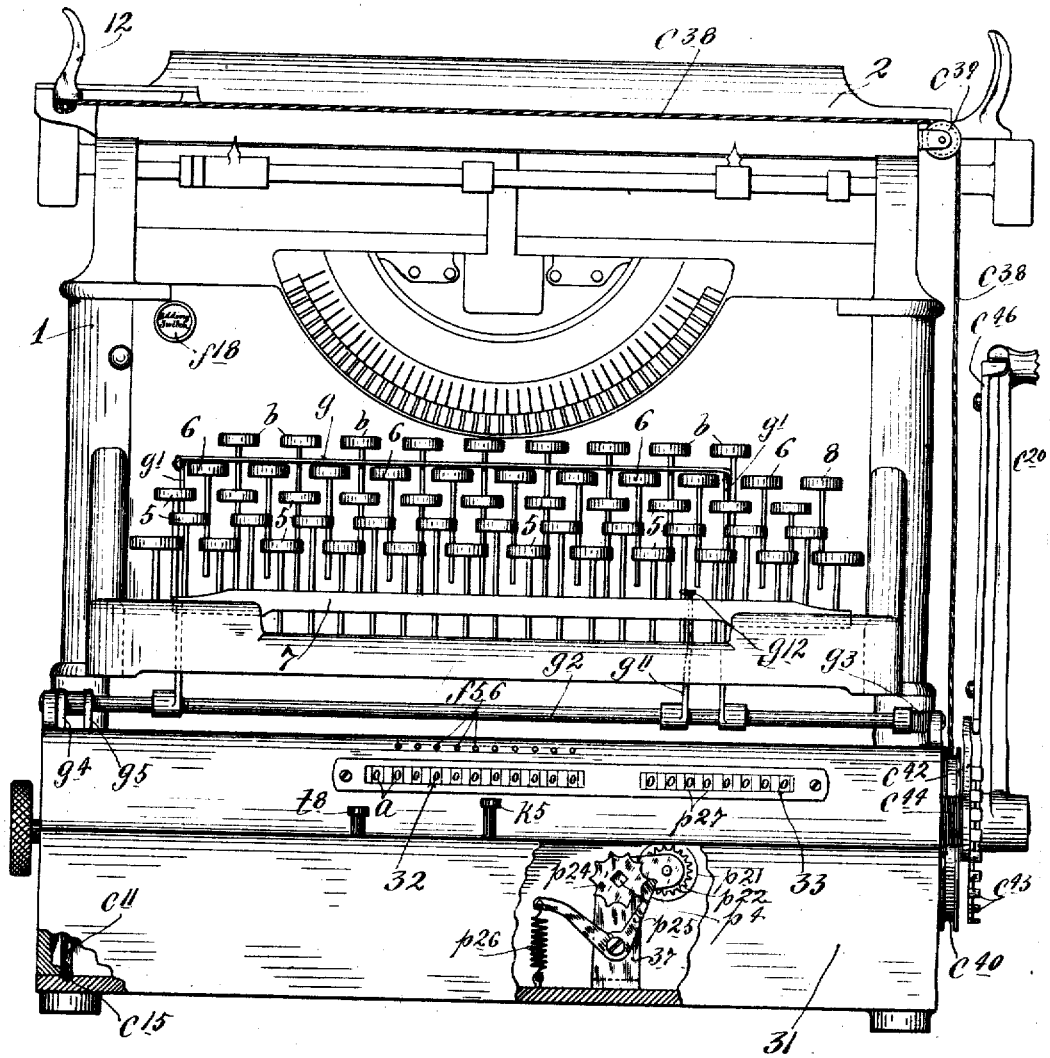

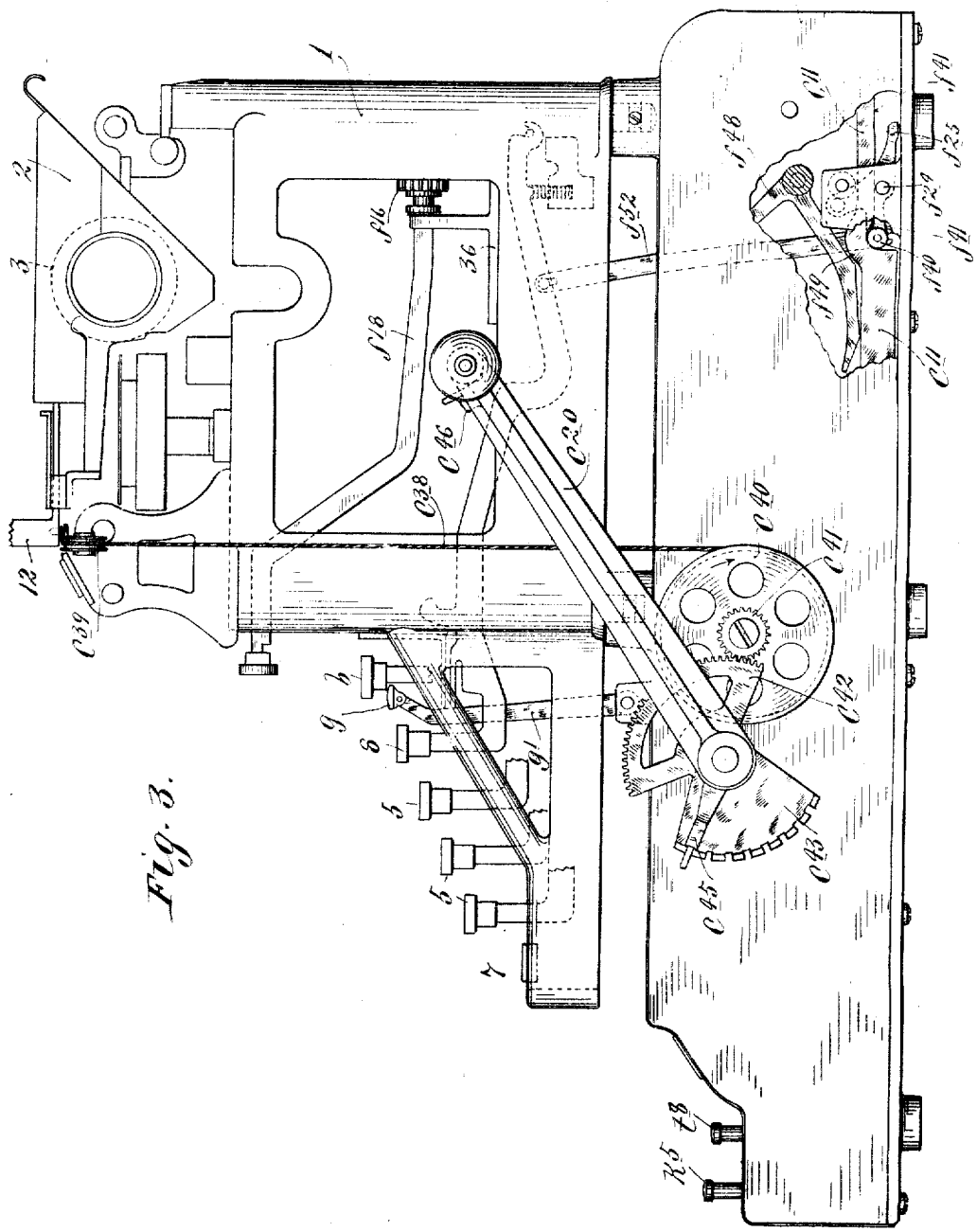

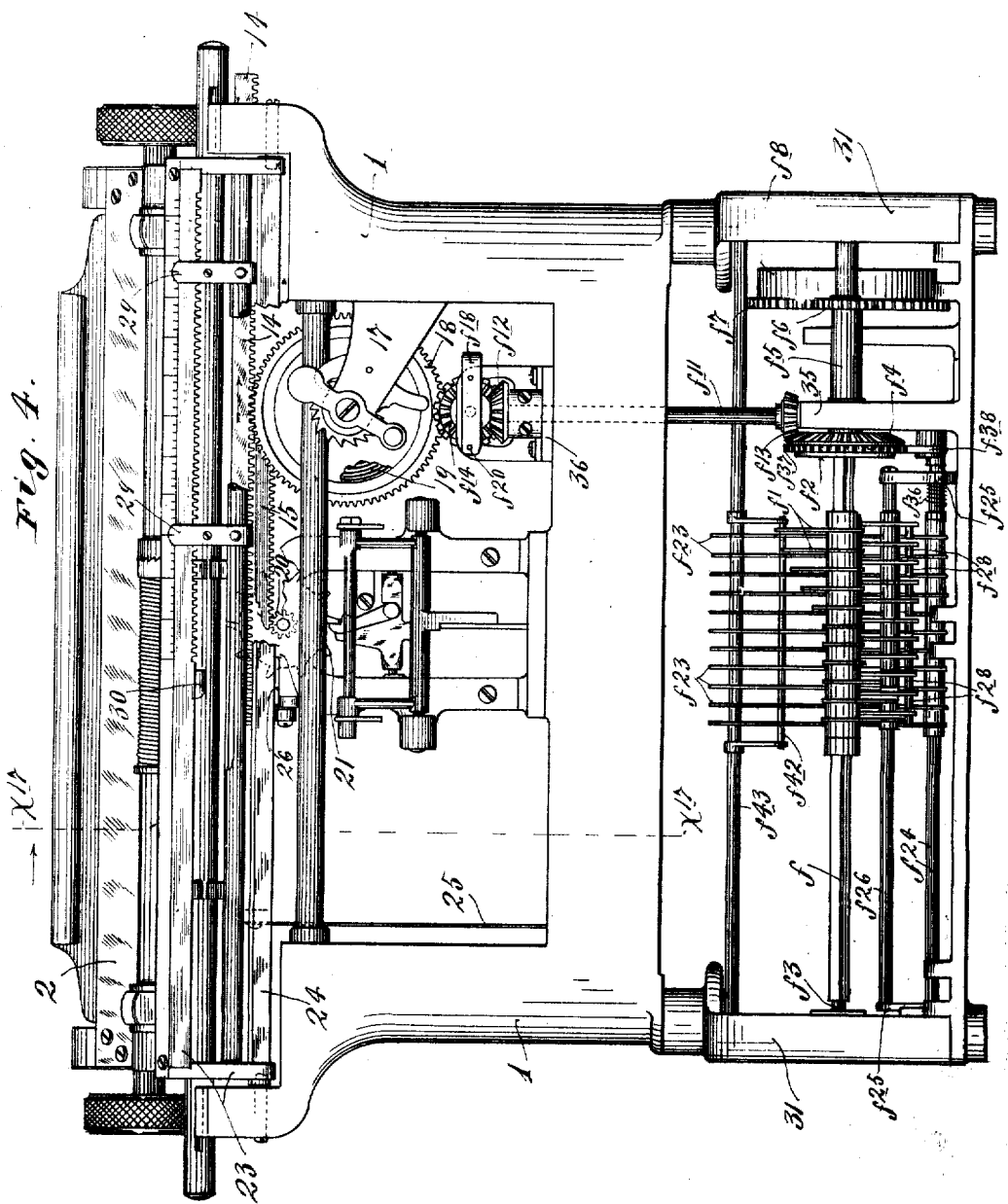

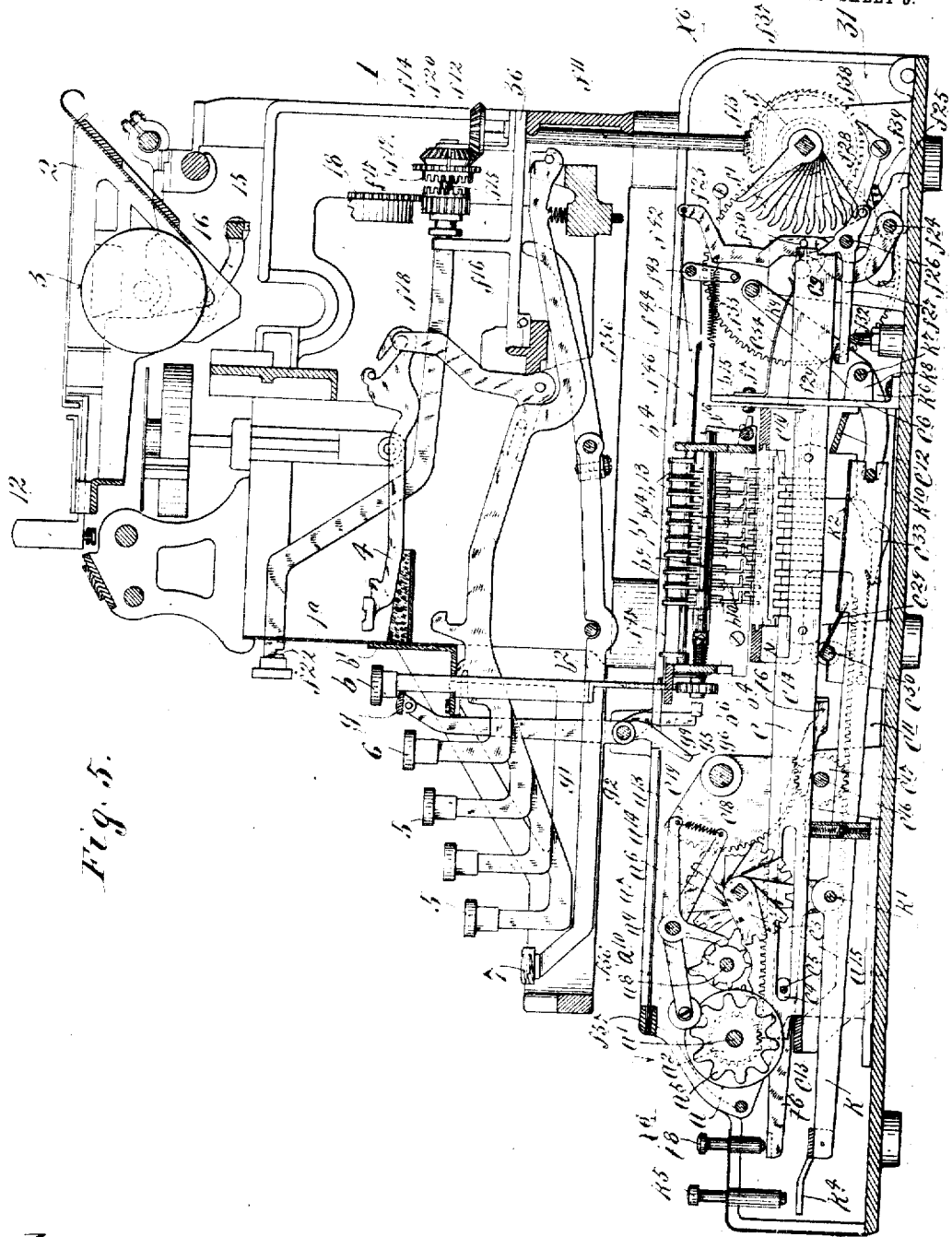

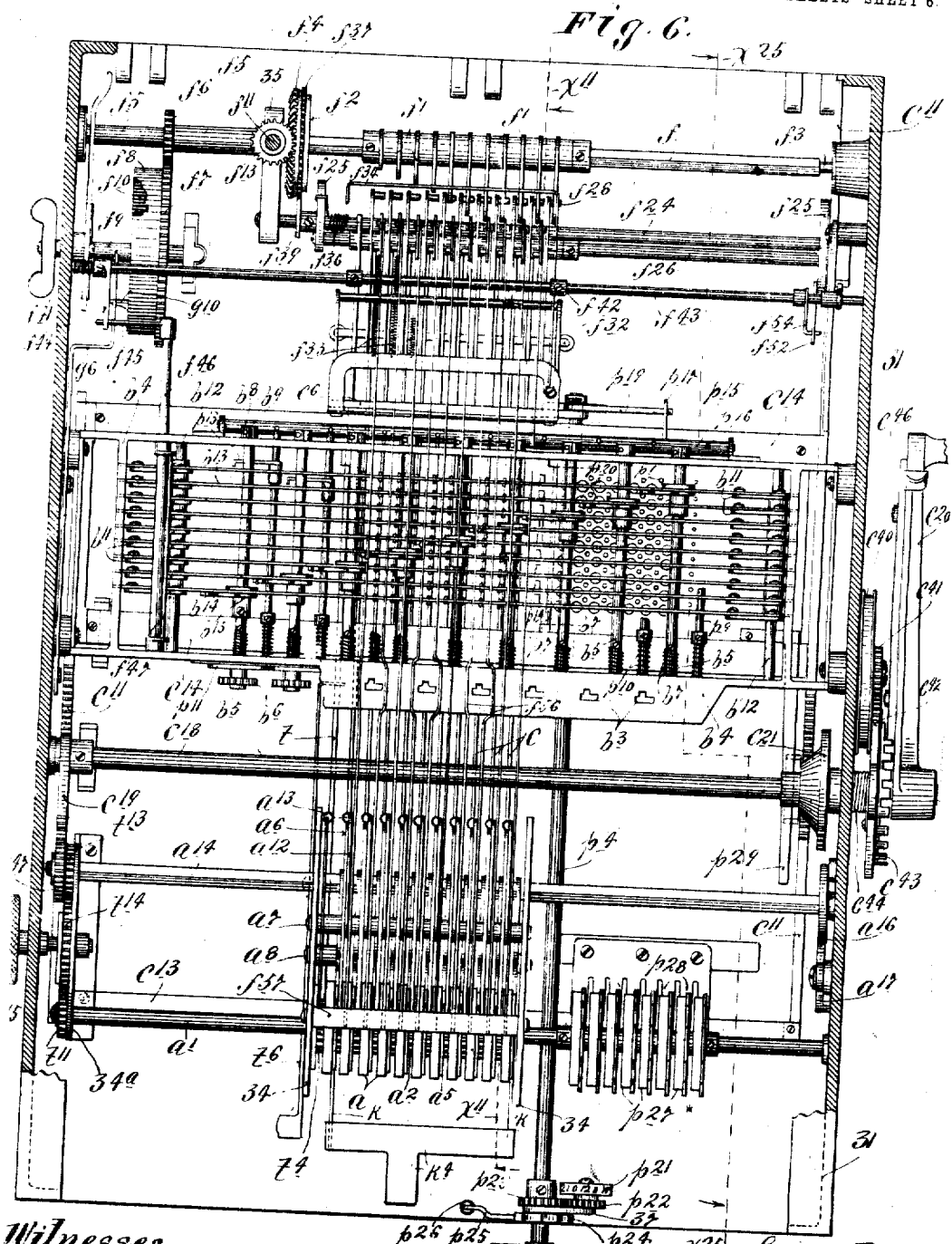

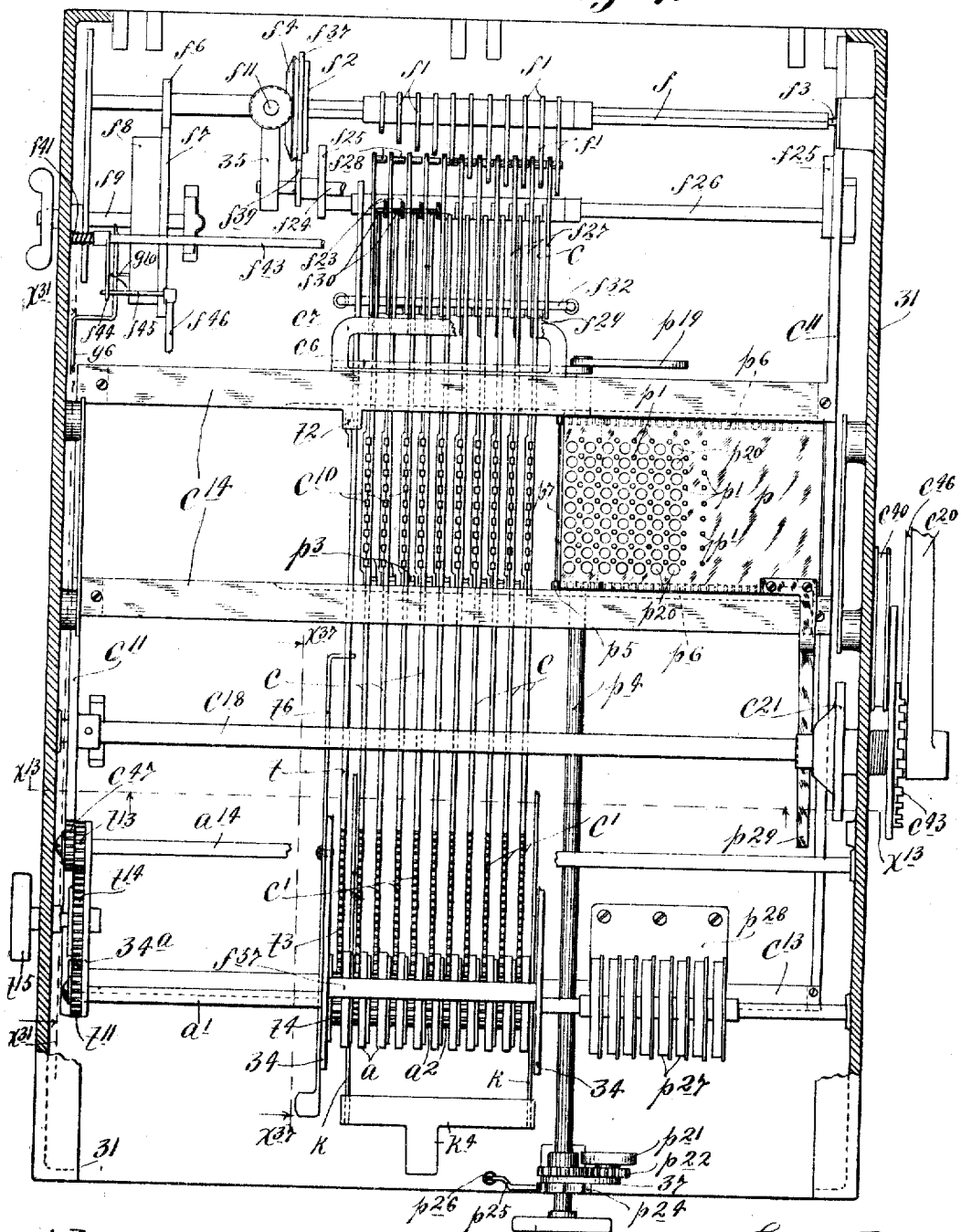

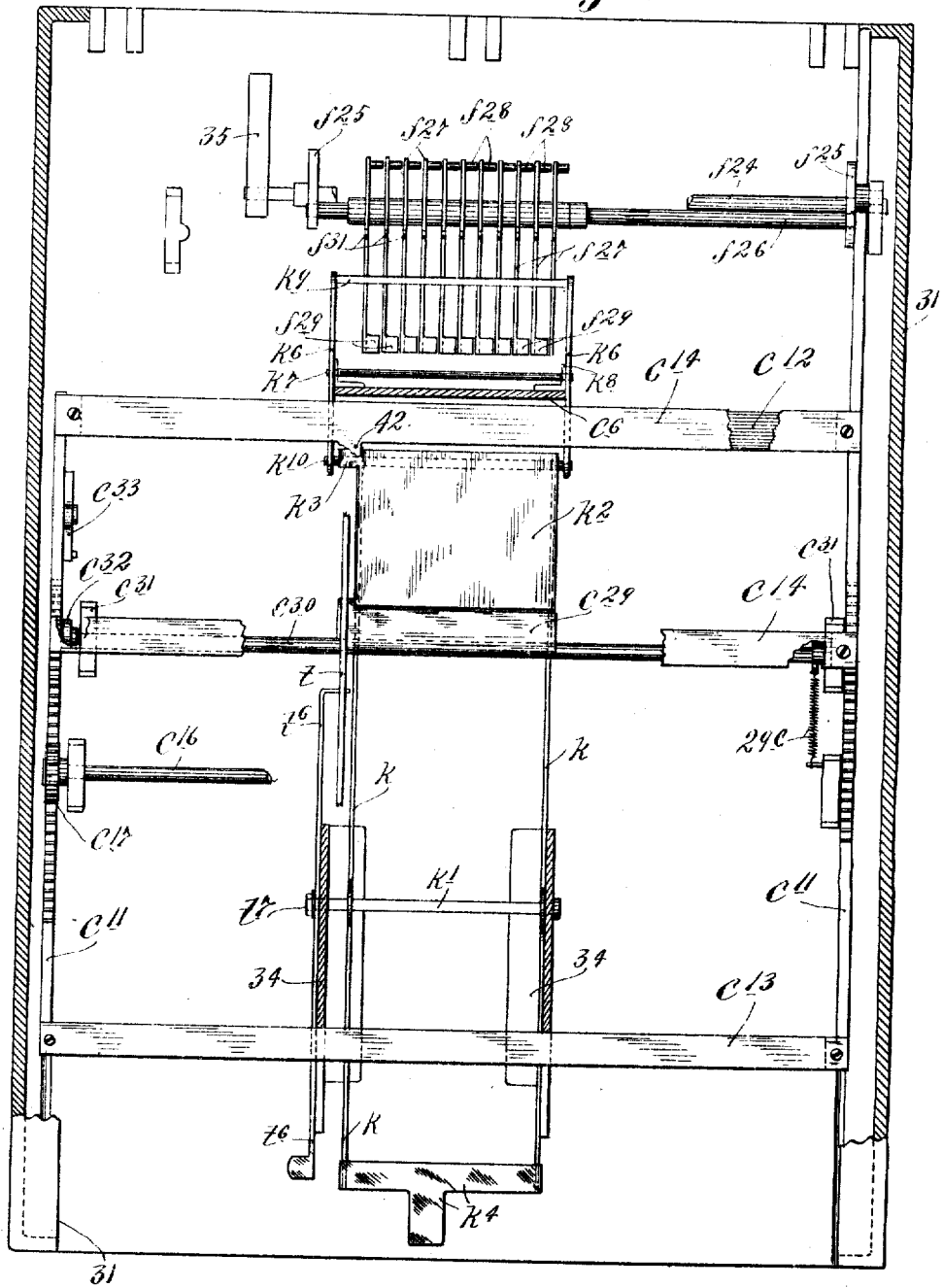

H. HANSON.
COMBINED TYPE WRITING AND COMPUTING MACHINE.
APPLICATION FILED AUG. 30, 1905.

No. 905,421.

Patented Dec. 1, 1908.
24 SHEETS—SHEET 9.

Fig. 10.

Fig. 9.

Witnesses:
A. H. Opsahl.
E. W. Jeppesen.

Inventor
Hans Hanson.
By his Attorneys,
Williamson & Merchant

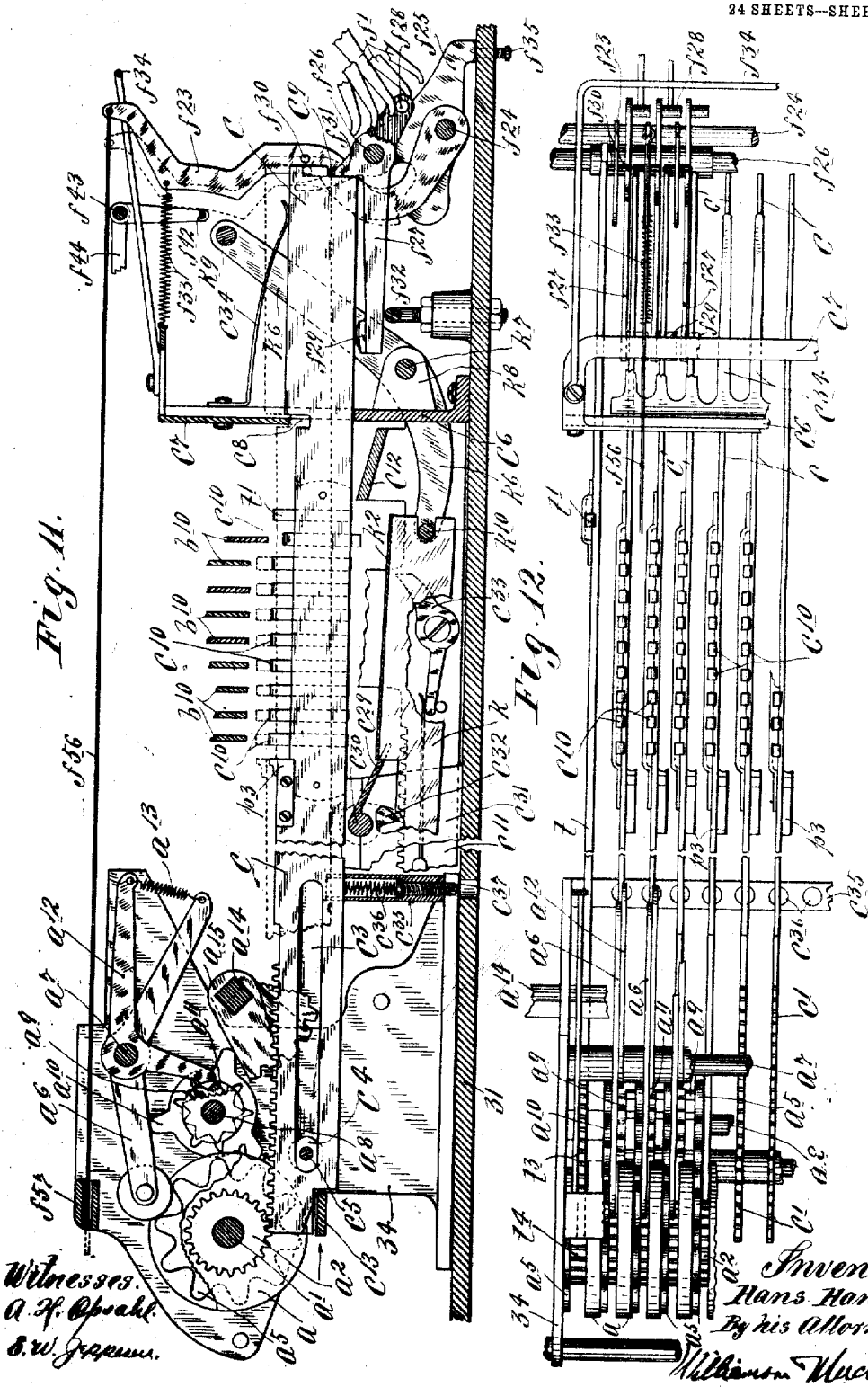

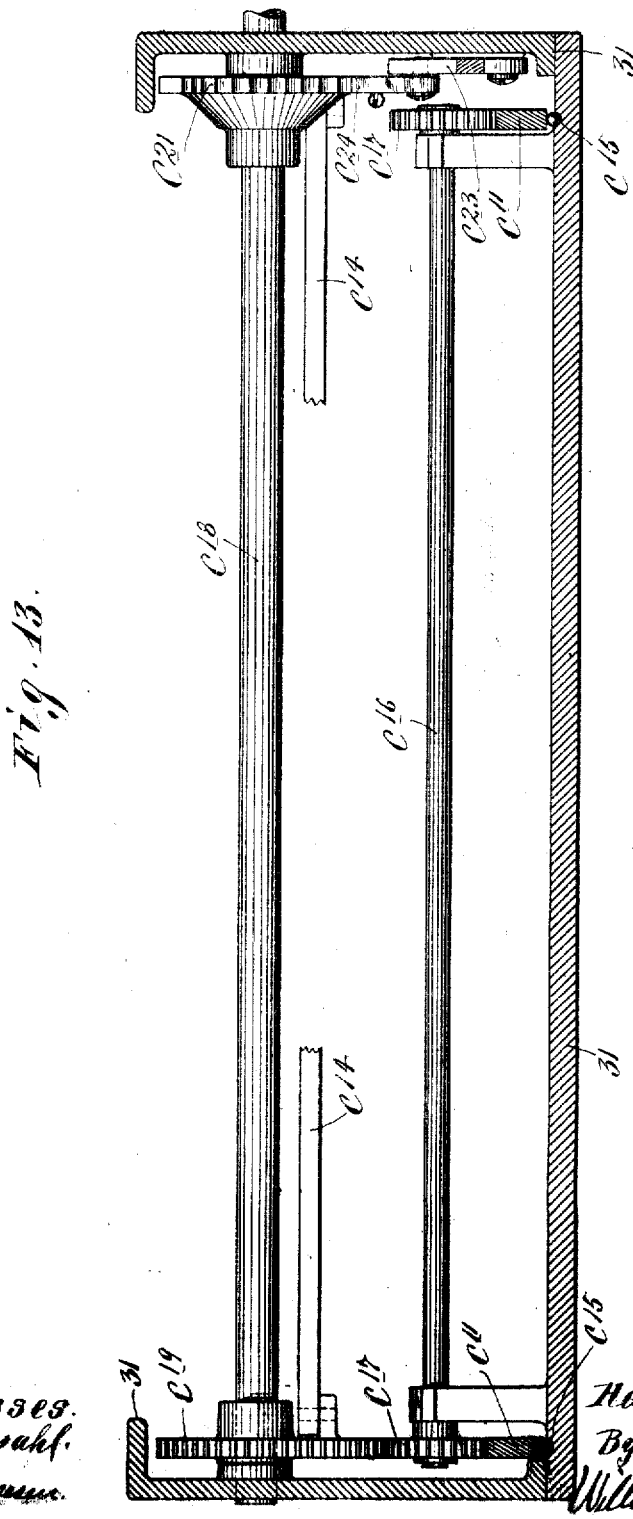

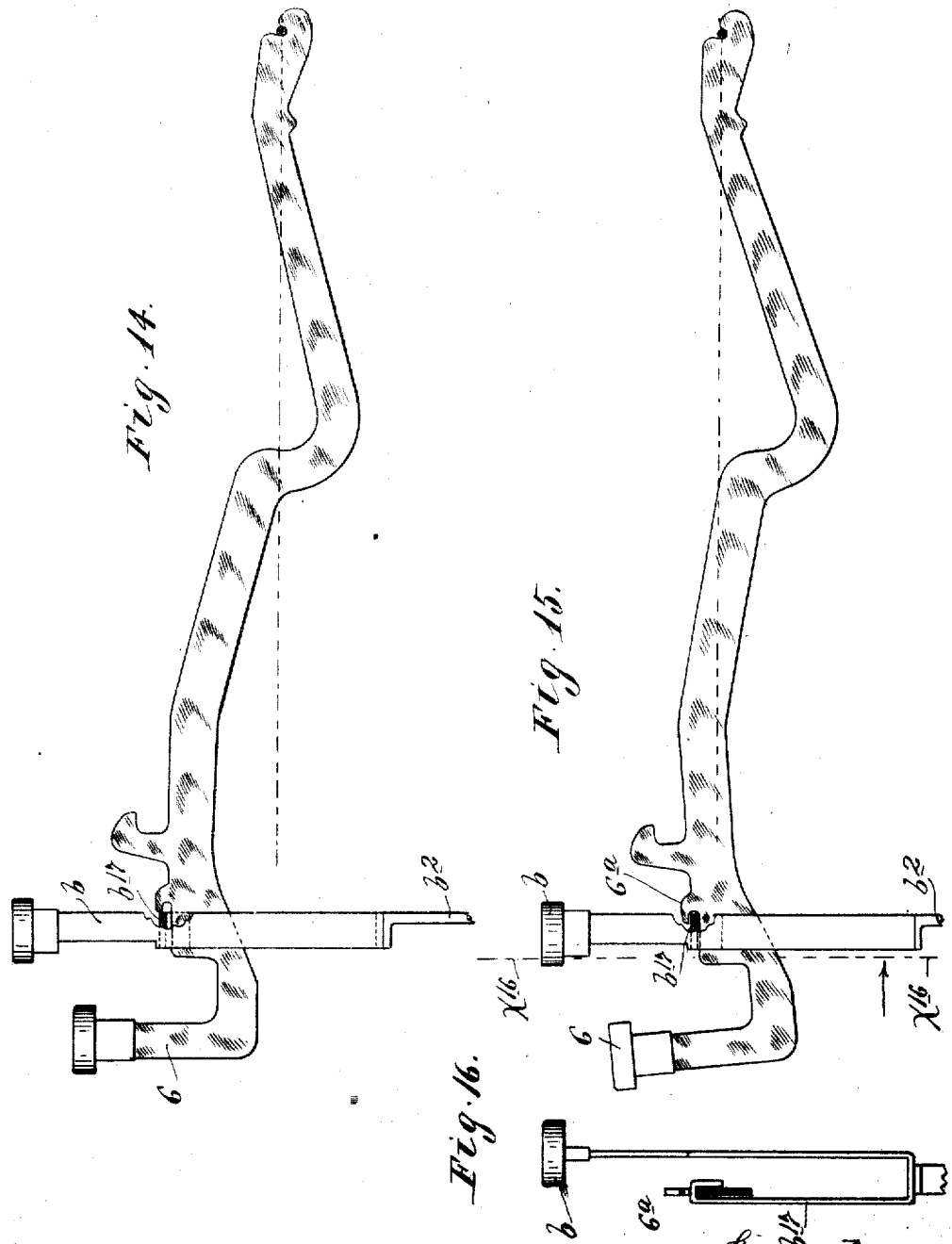

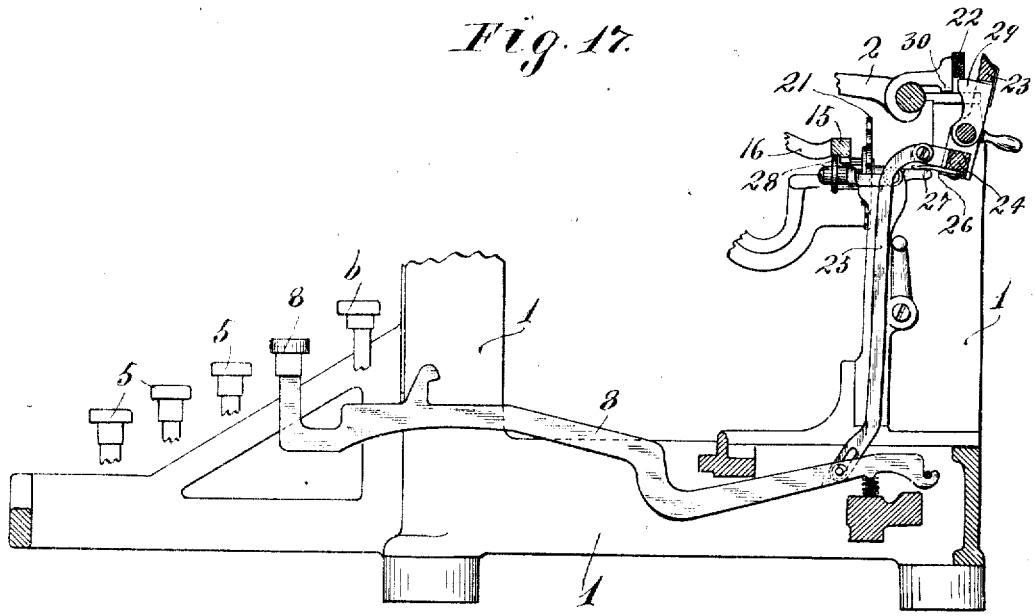

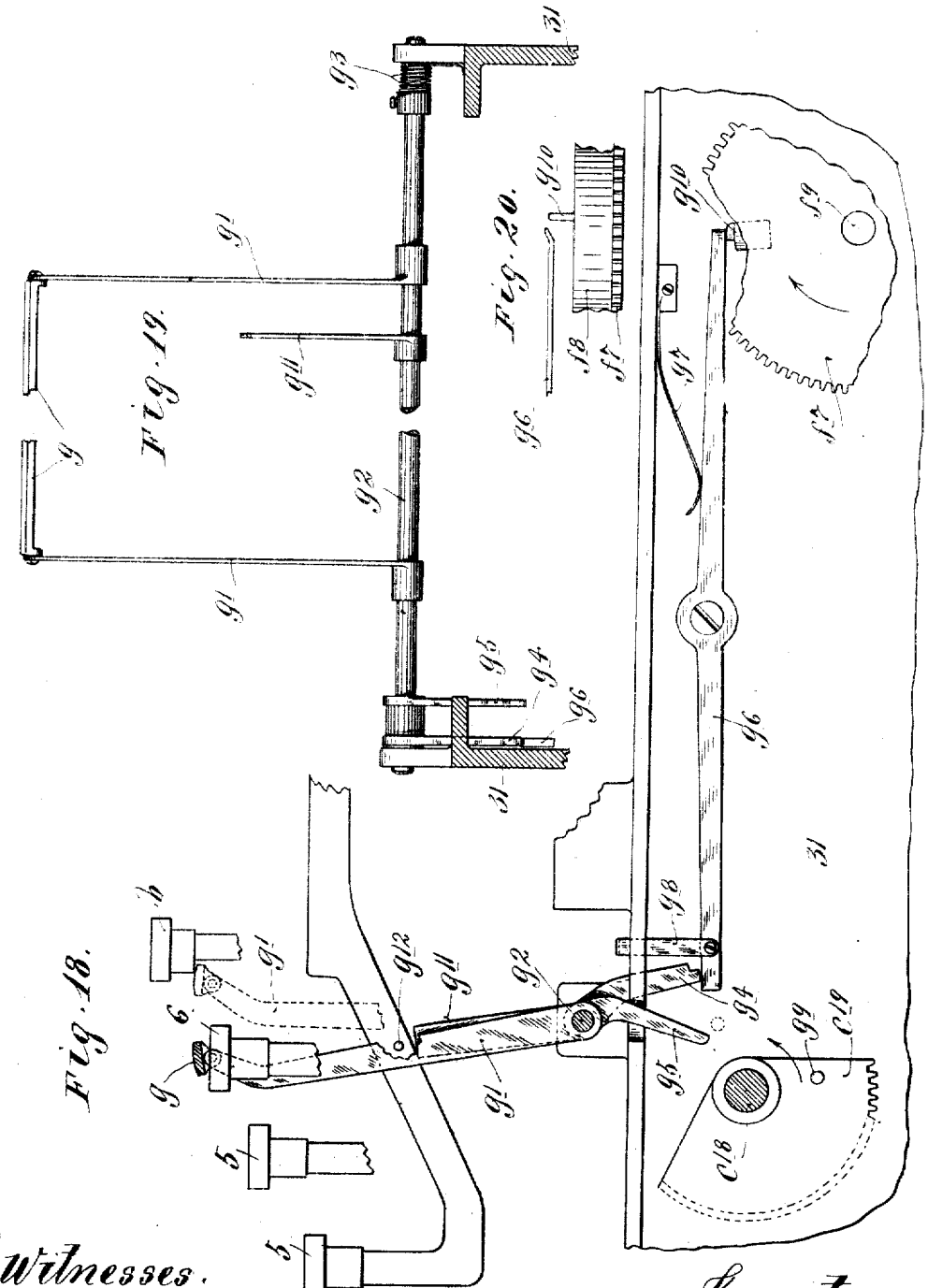

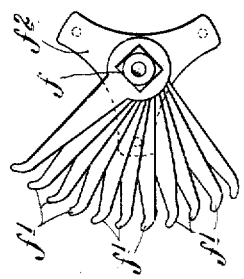
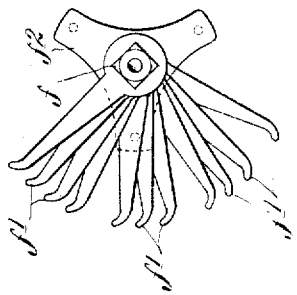
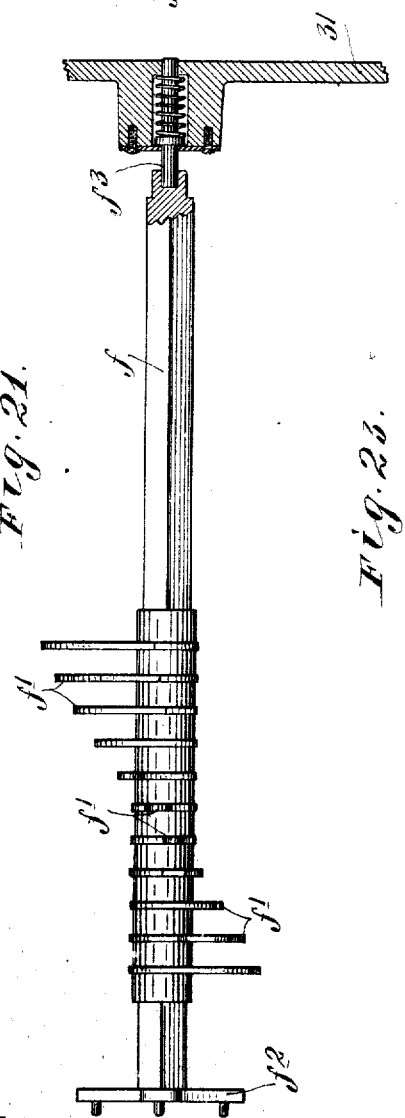
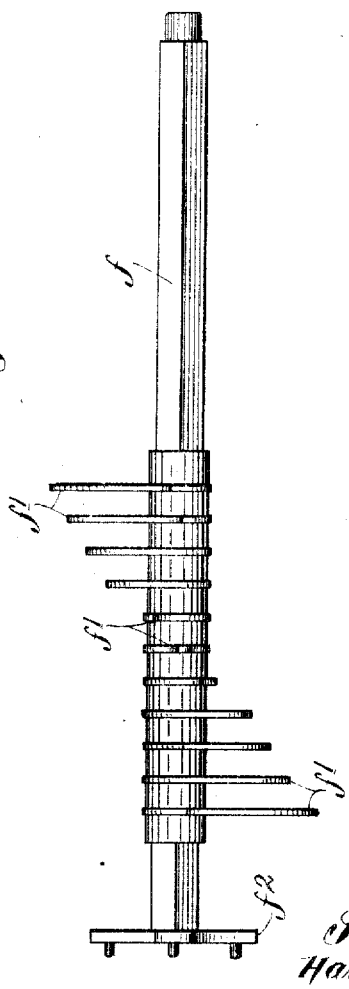

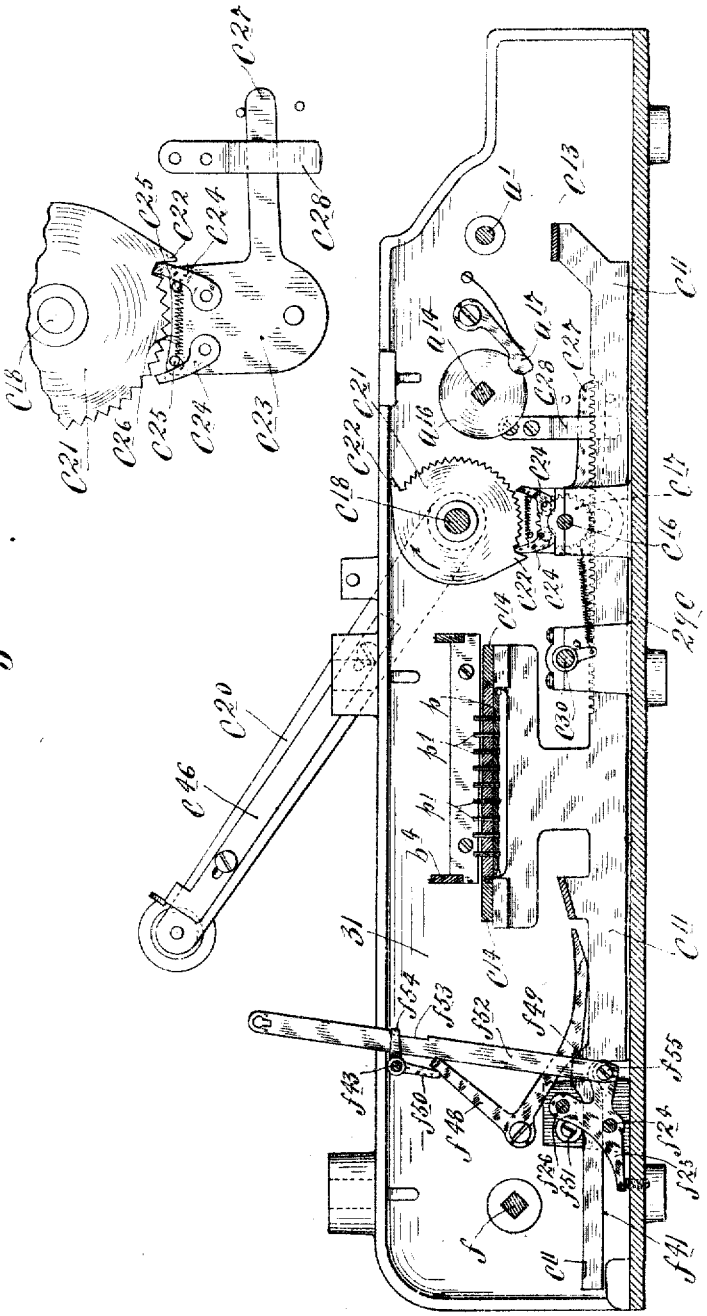

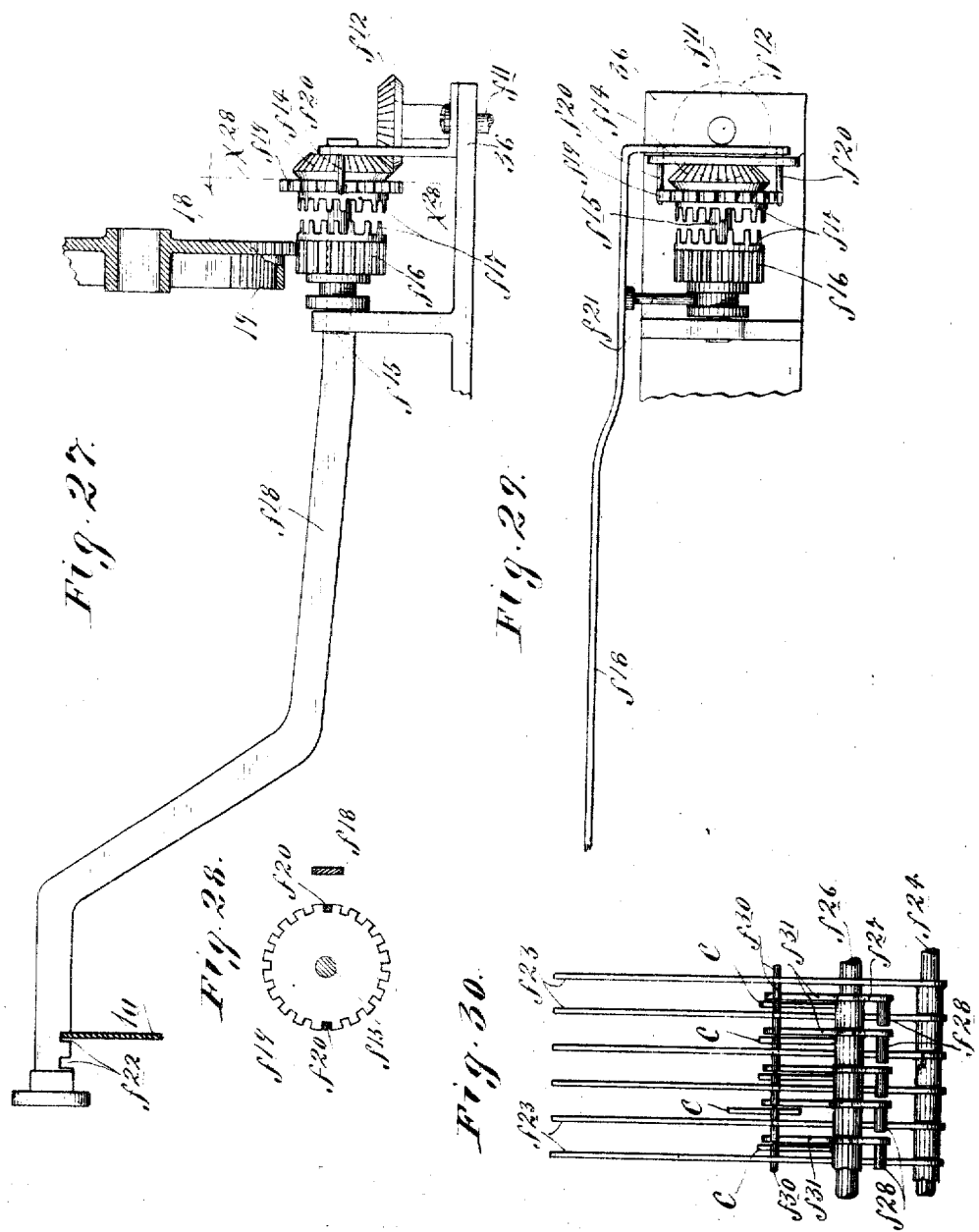

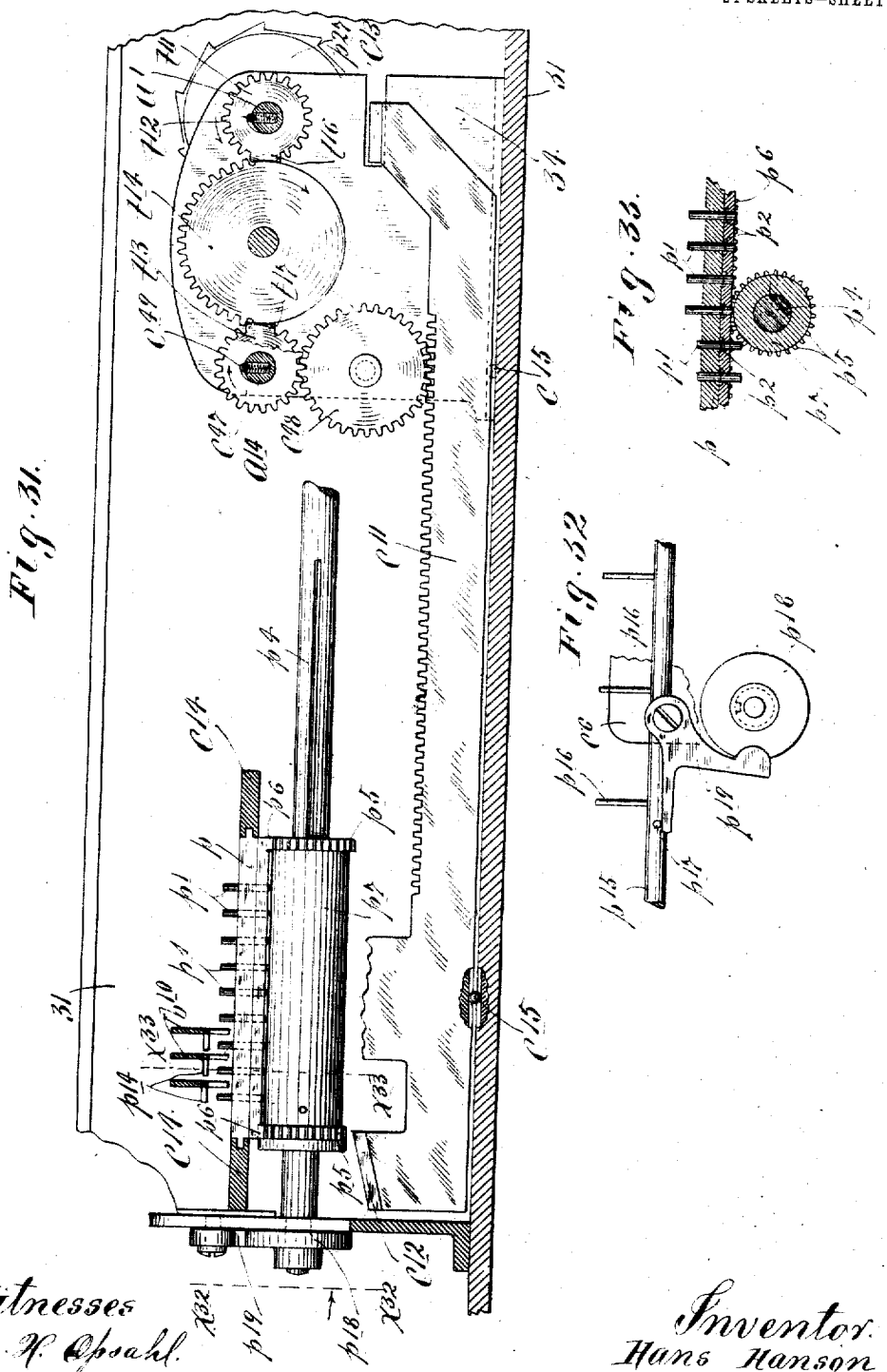

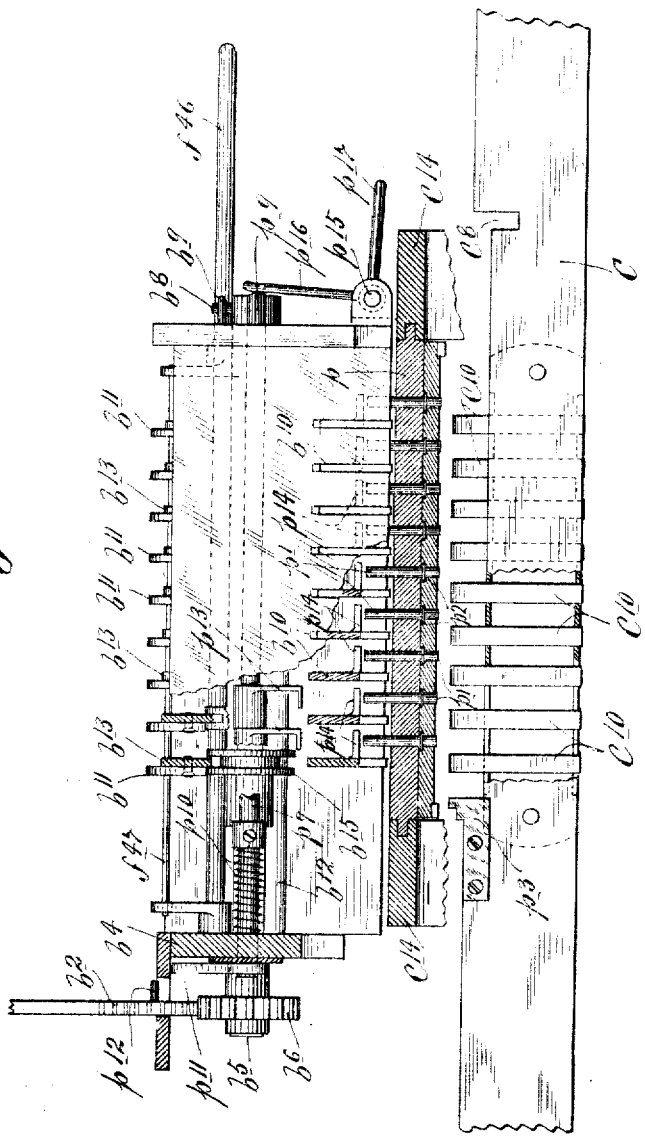

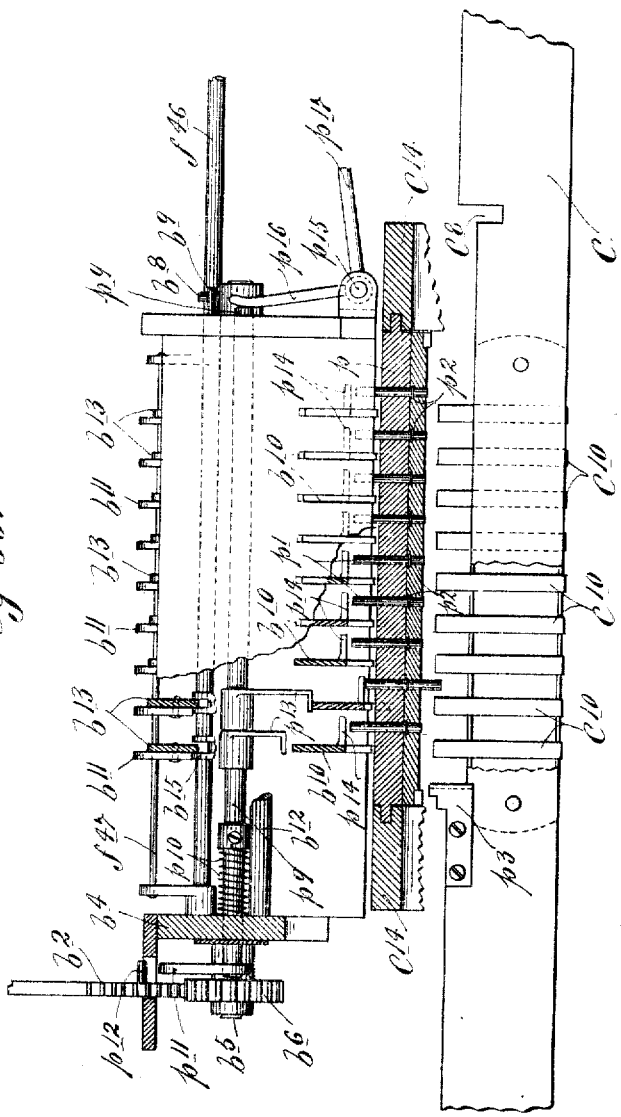

H. HANSON.
COMBINED TYPE WRITING AND COMPUTING MACHINE.
APPLICATION FILED AUG. 30, 1905.
905,421.
Patented Dec. 1, 1908
24 SHEETS—SHEET 21.
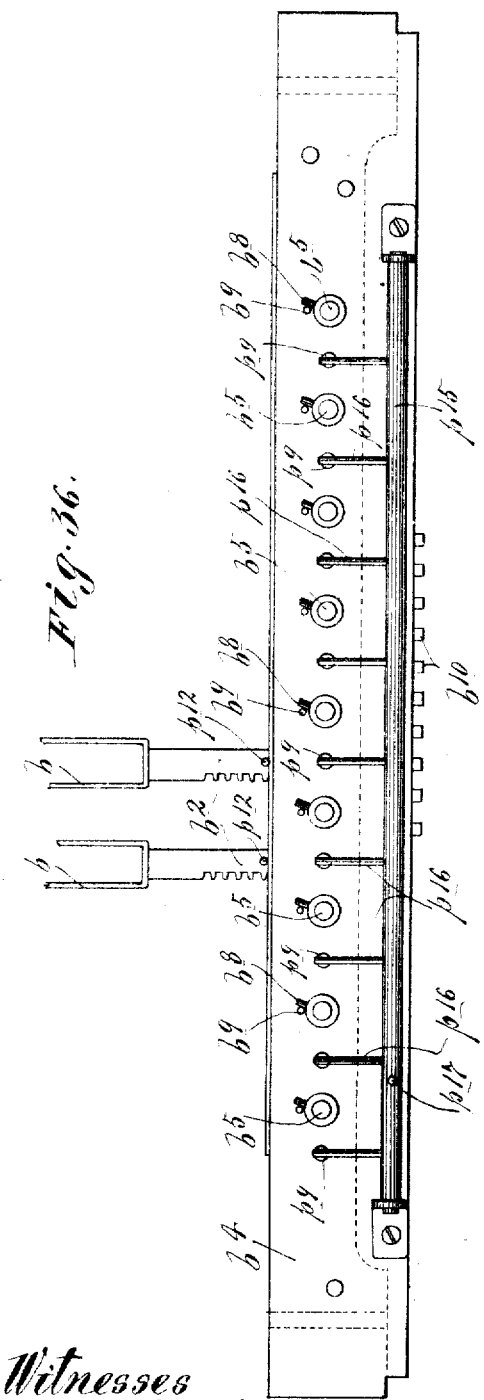
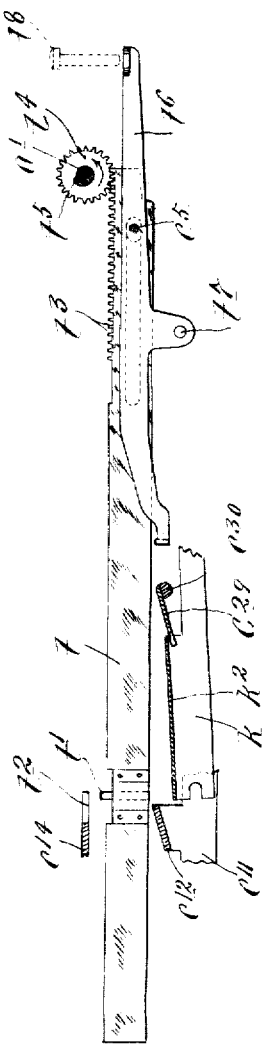
Witnesses
A. H. Opsahl.
E. W. Jeppesen.
Inventor.
Hans Hanson
By his Attorneys
Williamson Merchant H. HANSON.
COMBINED TYPE WRITING AND COMPUTING MACHINE.
APPLICATION FILED AUG. 30, 1905.
905,421.
Patented Dec. 1, 1908.
24 SHEETS—SHEET 22.
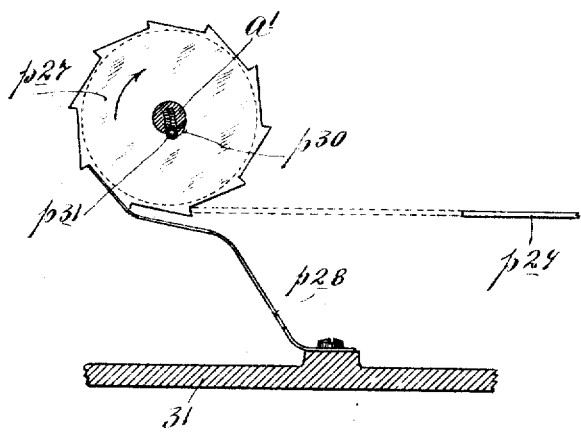
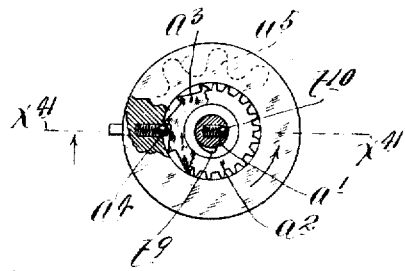
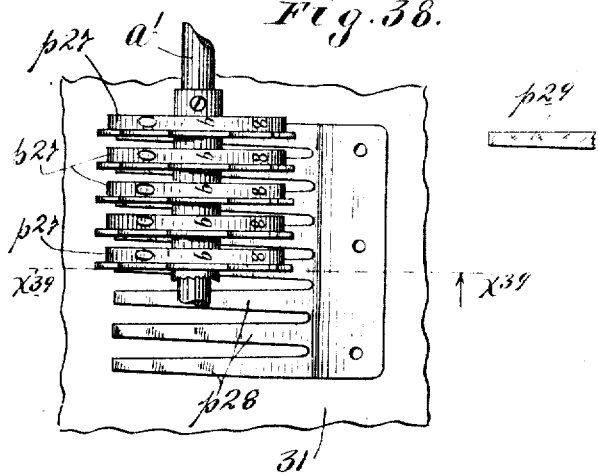
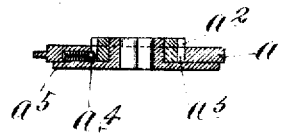
Witnesses.
A. H. Opsahl.
E. W. Jeppesen.
Inventor.
Hans Hanson
By his Attorneys.
Williamson Merchant H. HANSON.
COMBINED TYPE WRITING AND COMPUTING MACHINE.
APPLICATION FILED AUG. 30, 1905.
905,421.
Patented Dec. 1, 1908.
24 SHEETS—SHEET 23.
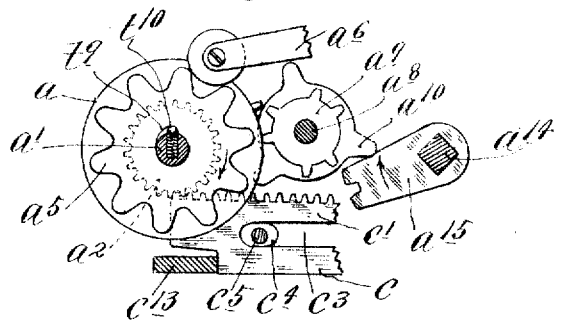
Fig. 42.
Fig. 43.
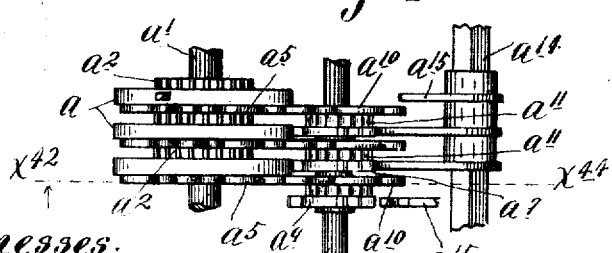
Fig. 44.
Fig. 45.
Witnesses
A. H. Opsahl
E. W. Jackson
Inventor
Hans Hanson
By his Attorneys
Williamson & Merchant H. HANSON.
COMBINED TYPE WRITING AND COMPUTING MACHINE.
APPLICATION FILED AUG. 30, 1905.
905,421.
Patented Dec. 1, 1908.
24 SHEETS—SHEET 24.
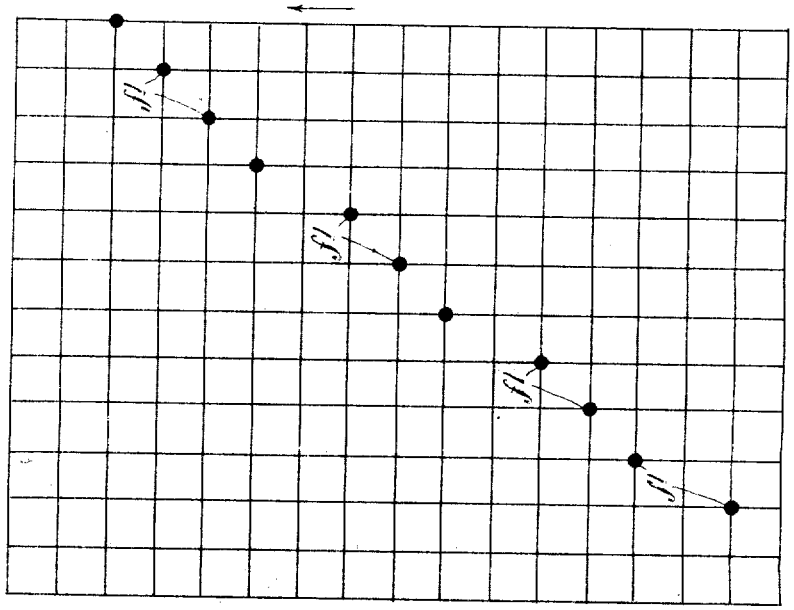
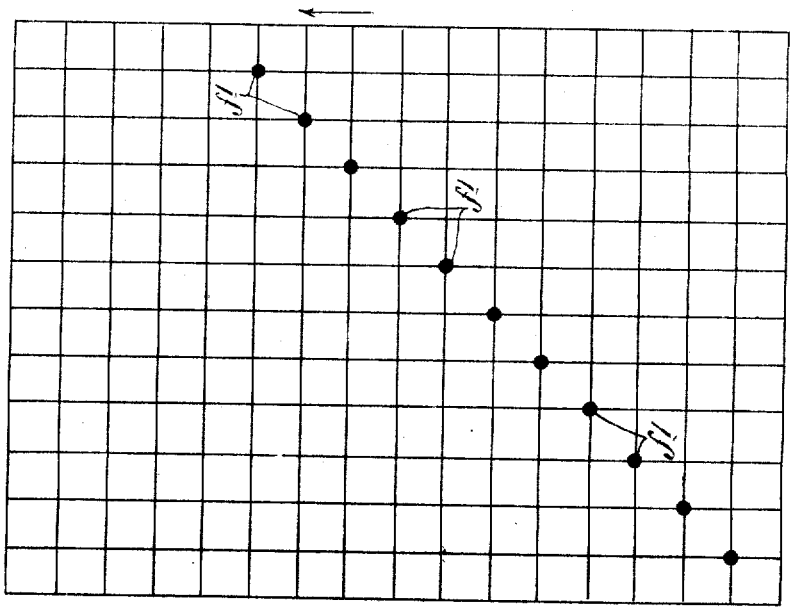
Witnesses.
A. H. Opsahl.
E. W. Jeppesen.
Inventor.
Hans Hanson.
By his Attorneys.
Williamson Merchant

UNITED STATES PATENT OFFICE.

HANS HANSON, OF HARTFORD, CONNECTICUT.

COMBINED TYPE-WRITING AND COMPUTING MACHINE.

No. 905,421.　　　　Specification of Letters Patent.　　　　Patented Dec. 1, 1908.

Application filed August 30, 1905. Serial No. 276,414.

*To all whom it may concern:*

Be it known that I, HANS HANSON, citizen of the United States, residing at Hartford, in the county of Hartford and State of Connecticut, have invented certain new and useful Improvements in a Combined Type-Writing and Computing Machine; and I do hereby declare the following to be a full, clear, and exact description of the invention, such as will enable others skilled in the art to which it appertains to make and use the same.

This invention relates to computing machines, and combined computing and typewriting machines, and has for its object to provide certain improvements on the machine disclosed in my pending application Serial No. 113,453, filed June 27, 1902, with a view of securing greater efficiency, and putting the machine in better commercial form.

To the above ends, the invention consists of the novel devices and combinations of devices hereinafter described and defined in the claims.

The following is a brief outline of the machine as illustrated in the accompanying drawings and hereinafter more fully described, and a summary of the operation of which is to be found at the end of the descriptive matter. The computing mechanism is chiefly contained in a box-like case, on top of which the typewriter is mounted, the two being firmly connected together. The operative connections between the two machines are such that the work of the typewriter is not restricted in any way, either in respect to speed or to lightness of touch. The keyboard of the typewriter is provided with an additional series of keys for operating the computing mechanism and the numeral printing devices of the typewriter. The carriage driving mechanism is connected with, and controls, a decimal order selecting device of the computing mechanism. The computer belongs to the key-set and lever-operated class. The typewriter carriage can be connected with the computing mechanism, or disconnected therefrom, at will. When thus connected, the computing mechanism will add the numbers listed on the paper, and the numbers may be printed in any desired column spaces, and when the two machines are disconnected from each other, the typewriter may be used in the ordinary way, for writing, without computing, and the computing mechanism is also ready for multiplication. The computer comprises a register, register actuating bars, adapted to be adjusted, or set, by the computer keys for differential action on the register, and an operating lever and intermediate devices for causing said register bars to actuate the register, and, as a special feature of improvement, includes secondary preliminary representation devices, whereby the register can be repeatedly actuated, and the action on the register can be shifted from one series of denominations to other series, for the purposes of multiplication, according to the several digits in the multiplier, and without requiring the multiplicand to be reset. Conveniently arranged in an axial line with the register wheels, are a series of indicator wheels, to indicate the number of oscillations given by the operating lever to the register actuating devices, and in which denominational orders such oscillations are made. Connected with the selecting devices are a series of indicating rods for the register, which serve to point out to the operator the particular denomination affected when the computer key is operated. Connections are also provided between the operating lever, the typewriter carriage, and the paper feeding devices thereon, whereby the said carriage may be returned either part way, or the full distance, of its return movement, and at the same time, the paper thereon may be fed, for line spacing, by the operation of the lever, or the carriage and the paper feed devices may both be left standing still, at will, during such lever operations. The machine also comprises error-correcting devices and certain safety devices, such as an alternately movable key protector, to prevent accidental operation of different classes of keys; a device to insure full strokes of the operating lever, and devices to insure accurate work during high speed, whereby the computer can be safely operated at any degree of speed of which the typewriter itself is capable. These, and other features, will appear more fully from the detailed description thereof and be pointed out in the claims.

The invention is illustrated in the accompanying drawings, wherein like characters indicate like parts throughout the several views.

Figure 1 is a plan view of the combined typewriter and computing machine, some parts being indicated in diagram only, and some parts being removed. Fig. 2 is a front elevation of the improved machine, some parts being broken away. Fig. 3 is a right side elevation of the machine, some parts being broken away. Fig. 4 is a rear elevation of the machine, some parts being broken away, and some parts being removed. Fig. 5 is a vertical section taken completely through the machine, from front to rear thereof, approximately on the line $x^5$ $x^5$ of Fig. 1. Fig. 6 is a horizontal section taken through the machine approximately on the line $x^6$ $x^6$ of Fig. 5. Fig. 7 is a horizontal section taken through the machine lower down than the line $x^6$ $x^6$, and with some parts removed. Fig. 8 is a horizontal section taken through the machine still lower down than Fig. 7, and with many of the parts shown in Fig. 7 removed. Fig. 9 is a detail view in plan, showing the unit bars, so-called, their supporting frame, and certain associated parts, removed from the machine; some parts being broken away. Fig. 10 is a front elevation of the parts shown in Fig. 9, some parts being broken away. Fig. 11 is a view in section, taken on the line $x^{11}$ $x^{11}$ of Fig. 6, some parts being broken away. Fig. 12 is a plan view of the parts shown in Fig. 11. Fig. 13 is a transverse vertical section, taken on the line $x^{13}$ $x^{13}$ of Fig. 7, some parts being broken away and some parts being removed. Fig. 14 is a detail, illustrating the arrangement by which the numeral keys of the typewriter and the computing keys of the computer are caused to interlock. Fig. 15 is a view similar to Fig. 14, but illustrating different positions of the parts. Fig. 16 is a vertical section, taken on the line $x^{16}$ $x^{16}$ of Fig. 15. Fig. 17 is a fragmentary view in vertical section, from front to rear of the machine, taken approximately on the line $x^{17}$ $x^{17}$ of Fig. 4, some parts being removed. Fig. 18 is a skeleton view, partly in side elevation and partly in vertical section, illustrating the construction of the so-called "key protector" and its actuating means, some parts being broken away. Fig. 19 is a front elevation of some of the parts shown in Fig. 18. Fig. 20 is a plan view of certain of the parts shown in Fig. 18. Fig. 21 is a view principally in plan, but partly in section, showing a decimal order or register bar selector, and a yielding bearing for one end of the same. Fig. 22 is an end elevation of the selector shown in Fig. 21. Fig. 23 is a plan view, showing in detail a slightly modified form of the selector. Fig. 24 is an end elevation of the selector shown in Fig. 23. Fig. 25 is a vertical section, taken approximately on the irregular line $x^{25}$ $x^{25}$ of Fig. 6. Fig. 26 is an enlarged detail of a device for insuring full strokes of the operating lever. Fig. 27 is a detail, principally in side elevation, but with some parts sectioned, showing a clutch device for coupling the decimal order selector to the typewriter carriage, at will. Fig. 28 is a section on the line $x^{28}$ $x^{28}$ of Fig. 27. Fig. 29 is a plan view of the clutch shown in Fig. 27. Fig. 30 is a detail in rear elevation, showing some of the register bars, register bar latches, and register bar lifting levers. Fig. 31 is a vertical section, taken on the line $x^{31}$ $x^{31}$ of Fig. 7, some parts being broken away. Fig. 32 is a detail, looking at certain parts shown in the vicinity of the line marked $x^{32}$ $x^{32}$ of Fig. 31. Fig. 33 is a section on the line $x^{33}$ $x^{33}$ of Fig. 31. Fig. 34 is a detail in section, taken from front to rear of the machine, and showing the multiplying controller, so-called, interposed between the unit bars and the register bars. Fig. 35 is a view similar to Fig. 34, but with certain of the parts in different positions. Fig. 36 is a detail in rear elevation of the parts shown in Figs. 9 and 10. Fig. 37 is a detail in section, on the line $x^{37}$ $x^{37}$ of Fig. 7. Fig. 38 is a detail in plan, showing a set of multiplier indicating wheels, and coöperating parts. Fig. 39 is a section on the line $x^{39}$ $x^{39}$ of Fig. 38. Fig. 40 is a detail in elevation, showing one of the wheels of the register, some parts being broken away, and some parts being removed. Fig. 41 is a section on the line $x^{41}$ $x^{41}$ of Fig. 40. Figs. 42, 43 and 44 are sections taken on the line $x^{42}$ $x^{44}$ of Fig. 45, illustrating different positions of the wheels and carrying devices of the register. Fig. 45 is a plan view, showing in part the wheels and carrying mechanism of the register. Fig. 46 is a diagrammatic view, showing the so-called "register bar selector" laid out flat, and illustrating the relative positions of the tappets of the selector shown in detail in Figs. 21 and 22; and Fig. 47 is a similar view, showing the relative positions of the tappets of the selector shown in detail in Figs. 23 and 24, and which selector is adapted for use in producing punctuated printed records on the paper in the typewriter.

In the detailed description of my invention, the following classification of mechanism and reference characters have been made, to-wit: Typewriter, and register case supporting the same, designated by numerals. Register, designated by "$a$" and its powers. Computing keys, unit bars and intermediate connections, designated by "$b$" and its powers. Decimal order register bars, preliminary representation devices, and operating carriage, designated by "$c$" and its powers. Decimal order or register bar selector and decimal order indicator, designated by "$f$" and its powers. Key protector, designated by "$g$" and its powers. Multiplication devices, designated by "$p$" and its powers. Zero devices, designated by "$t$" and its powers.

*Typewriter and computer case supporting*

*same*.—The computer is shown as combined with or applied to a Number 5 Underwood typewriter, the construction and operation of which are well understood, and for the purposes of this case, it is only thought necessary to identify a few of the typewriter parts.

The numeral 1 indicates the frame of the typewriter. The numeral 2 indicates the typewriter carriage, 3 the impression roller mounted on said carriage, 4 the type bars, 5 the character keys exclusive of the numeral keys; 6 the numeral keys, 7 the spacing bar or bail, and 8 the tabulating key, all of which keys and spacing bar are yieldingly pressed upward.

Near its left hand end, the shaft of the impression roller 3 carries a ratchet wheel 9 with which coöperates a pawl 10 carried by a slide 11, the forward end of which is subject to the lever 12 of the line feed device, and which lever is pivotally attached to the typewriter carriage. (See Figs. 1 and 2.) A spring 13 attached to the slide 11 and to the frame of the typewriter carriage, yieldingly holds the pawl 10, slide 11 and lever 12, in the position shown in Fig. 1. The lever 12 has a limited movement toward the right, with respect to the carriage, Figs. 1 and 2, and by such movement operates to throw the pawl 10 into action on the ratchet wheel 9 and thereby impart a rotary step of paper feeding movement to the impression roller 3.

At the rear of the machine, the typewriter carriage carries two rack bars 14 and 15, the former of which is rigidly secured thereto and the latter of which is supported therefrom, with freedom for limited vertical movements, by pivoted arms 16. (See Figs. 4, 5 and 17.)

A bracket 17 on the typewriter frame 1 supports a carriage - driving spring - power device, involving a gear 18 and a motor spring 19. The gear 18 meshes with the carriage rack bar 14 and the spring 19 acts on said wheel with a force tending to move the typewriter carriage in the direction indicated by the arrow marked on the bar 14 in Fig. 4.

The carriage rack bar 15 normally meshes with a pinion 20 that is coupled to the escapement wheel 21 of the carriage escape mechanism, by a pawl and ratchet device, or one way clutch, (not shown) which permits free rotary movements of said pinion 20, with respect to said escape wheel, under return movements of the typewriter carriage, but couples the two together for common rotary movements in the other direction.

The escapement wheel 21 is intermittently released, to permit the step by step movement of the typewriter carriage, so that a letter spacing movement of said carriage will take place whenever one of the character keys, or numeral keys, or the space bar of the typewriter is depressed.

At its rear portion, the typewriter carriage 2 carries a frictional brake shoe 22 that is adapted to be engaged by the upper bar of an oscillatory frame 23, the shaft 24 of which is mounted on the frame 1. (See Figs. 4 and 17.) The tabulating key 8 is connected, by a link 25, to a lug on the pivot shaft 24 of the oscillatory frame 23. A finger 26 on said shaft 24 engages the rear end of a lever 27 pivoted to a stationary part of the typewriter and provided, at its forward end, with an antifriction roller 28 that engages with a smooth under portion of the carriage rack 15, as shown in Fig. 17.

When the tabulating key 8 is depressed, the frame 23 is oscillated forward, and the roller 28 is raised, thereby carrying the rack 15 out of mesh with the pinion 20 and permitting the typewriter carriage to move, from right toward the left with respect to Figs. 1 and 2, or from the left toward the right with respect to Fig. 4. By sufficient downward pressure on said tabulating key, the upper bar of said oscillating frame may be pressed against the brake shoe 22, so as to retard the movement of the typewriter carriage which is imparted thereto by its motor spring 19.

On the frame 23 are adjustable column stops 29 which, when the tabulating key is depressed and the frame 23 rocked forward, are adapted to engage a lug 30 on the typewriter carriage, (see Figs. 4 and 17) to variably stop said carriage.

In the construction illustrated, the typewriter is mounted directly upon and secured to a box like case 31, which, as will hereinafter appear, incloses the principal parts of the computing mechanism.

*Register*.—The register involves a plurality of single-toothed register wheels $a$, marked on their peripheries with the numerals 0 to 9, inclusive, and positioned so that their numerals will be exposed to view through a sight opening 32 of the case 31, there being, as shown, eleven such wheels in the register. These register wheels $a$ are mounted for independent rotations, in one direction, on a shaft $a^1$ that extends transversely of the machine and is mounted in one side of the case 31, and in a bearing $34^a$ secured to the bottom thereof. A gear $a^2$ is loosely mounted on the hub of each register wheel $a$ and receives a differential movement from its coöperating register bar, hereinafter to be described (see Figs. 6, 7, 11, 12, and 40 to 45 inclusive). As shown in Fig. 41, the wheel $a$ is made of two parts, the web thereof being formed integral with its hub, and brazed or riveted to the body of said wheel $a$. Between the gear $a^2$ and the web of the register wheel $a$, and rigidly secured to the former, is a ratchet wheel $a^3$ that is acted upon by a spring pressed ball $a^4$, mounted in the body of said wheel $a$, as shown in Figs. 40 and 41.

The ratchet wheel $a^3$ is provided with ten teeth, and is rotated with the gear $a^2$, when the latter is acted upon by the register bar, and, through the spring-pressed ball $a^4$, will move the register wheel $a$, in one direction, a number of steps corresponding to the number of unit movements of the register bar, and, under return movements, the teeth will pass unobstructed under the ball $a^4$. The web of the wheel $a$ is formed with ten teeth $a^5$. The spring-pressed ball $a^4$ causes the ratchet wheel $a^3$ to positively rotate the register wheel $a$ in the direction of the arrow marked thereon in Fig. 40, but permits said ratchet wheel to make a return or reverse movement while said register wheel is held stationary. The register wheels are held against accidental movement by roller-equipped, spring-pressed levers $a^6$ (see Figs. 5 and 11), that are pivoted on a transverse shaft $a^7$, supported by bearing plates 34, with their rollers in engagement with the peripheral teeth $a^5$ of said register wheels.

The carrying mechanism of the register is best illustrated in Figs. 5, 11, 42, 43, 44 and 45. Parallel with and rearward of the shaft $a^1$ is a shaft $a^8$, also supported by the bearing plates 34. Loosely mounted on said shaft $a^8$ is a series of composite carrying wheels, in number one less than the number of coöperating register wheels, and each consisting of three sections, to-wit, a six-toothed wheel $a^9$, a three-toothed wheel $a^{10}$, and between these two wheels, a nine-toothed star wheel $a^{11}$, the three wheels being connected to rotate as if one, and the composite wheel being frictionally held, against accidental rotation, by a pawl lever $a^{12}$ mounted on the shaft $a^7$, in engagement with the star wheel $a^{11}$, and having its rear end connected to the rear end of the corresponding lever $a^6$ by a coiled spring $a^{13}$. See Figs. 11 and 12.

By reference particularly to Figs. 42, 43 and 44, it will be seen that the six-toothed wheel $a^9$ is made as if it were a nine-toothed gear wheel with every third tooth cut out, leaving three divisions of two teeth each. The normal position of the carrying mechanism is best shown in Figs. 5, 11 and 42, by reference to which, it will be noted that the six-toothed wheel $a^9$ lies in the path of a single tooth of the corresponding register wheel $a$, (see also Figs. 40 and 45). When one of said register wheels $a$ is moved from its ninth to its tenth, or zero, position, its tooth engages a tooth of the carrying wheel $a^9$ which stands within its arc of movement, and thereby shifts the composite carrying wheel, from its normal position indicated in Fig. 42, into its intermediate position indicated in Fig. 43, in which position it remains for the time being. The above step of movement of the said composite carrying wheel is one-ninth of its complete rotation. The three teeth of the wheel $a^{10}$ are, of course, shifted, when the composite wheel is thus moved, but are not moved within the arc of movement of the teeth $a^5$ of the corresponding register wheel.

Rearward of the shaft $a^8$, is a shaft $a^{14}$ which carries radiating gear segments or toothed arms $a^{15}$, that are spaced laterally, and set spirally on said shaft, as best shown in Figs. 42 to 45, but seen also in Figs. 11 and 12. There is one arm $a^{15}$ for each six-toothed carrying wheel $a^9$, and the teeth of the latter lie in the path thereof, so that, when said carrying wheel has been shifted from its normal position to the position shown in Fig. 43, one of the advance teeth thereof will be engaged by the teeth of said arm when the shaft $a^{14}$ is oscillated from the position shown in Fig. 43 into the position indicated in Fig. 44. This movement of said shaft $a^{14}$, in moving the arm $a^{15}$ as just noted, causes the latter to act upon the wheel $a^9$, and imparts a further two-ninths of a complete rotation to the composite carrying wheel, so that the said carrying wheel, in Fig. 44 stands one-third of a complete rotation ahead of the carrying wheel shown in Fig. 42. It will also be noted that if the toothed arm $a^{15}$ be moved while the carrying wheel stands as shown in Figs. 42 and 44, it will have no action whatever on said carrying wheel. However, the movement of the composite carrying wheel, from the position indicated in Fig. 43 into the position indicated in Fig. 44, causes one of the teeth of the three-toothed wheel $a^{10}$ to engage one of the ten teeth $a^5$ of the register wheel $a$ of next higher decimal order, and imparts a one-tenth rotation thereto, thus carrying "10" from the lower to the higher denominational order.

It is now evident that all of those composite carrying wheels which have not, in advance of the movement of the respective toothed arms $a^{15}$, been moved from normal position, by the action thereon of the tooth of the corresponding register wheel $a$, will remain in normal position and will not be affected in any way by the subsequent movements of the coöperating toothed arms $a^{15}$.

The circumferential spacing between the outer ends of the toothed arms $a^{15}$ should be such that each arm will complete the movement of its coöperating carrying gear or wheel before the next toothed arm begins action on its coöperating carrying wheel, so that the carrying from its unit order to the tens order will be fully completed before the carrying from the tens order to the hundreds order is started, and so on throughout all of the orders. The circumferential distance between the first and last arms $a^{15}$ must be such that, with said arms in their normal positions, the teeth of the six-toothed wheel $a^9$ will not engage the same when the composite carrying wheel is partially rotated by the register wheel.

To yieldingly hold the toothed arms $a^{15}$ in normal positions, indicated in Fig. 5, the shaft $a^{14}$ is provided, near one end (see Figs. 6 and 25), with a disk $a^{16}$, having a single notch, with which engages the headed free end of a spring-pressed dog $a^{17}$, mounted on one side of the case 31. The shaft $a^{14}$ receives its rotary motion from the oscillations of the operating lever and intermediate devices, which will be more fully described later on.

The register shaft $a^1$ is yieldingly held in its normal position by a notched disk and coöperating dog, not shown, but which are of the same character as the disk $a^{16}$ and dog $a^{17}$, which, as just described, act upon the shaft $a^{14}$.

*Computing keys, unit bars, and intermediate connections.*—Directing attention to Figs. 2 and 5, in particular, it will be noted that the computer keys $b$ are mounted for vertical movements through the flange of an angle bar $b^1$ that is rigidly secured to the typewriter frame 1, just back of the numeral keys 6 and tabulating key 8. At their lower ends, these computer keys are provided with depending racks $b^2$ that work through seats $b^3$ formed in the forwardly projecting flange of a rectangular frame $b^4$, which latter is supported from the case 31. (Figs. 6 and 9).

Journaled in the rectangular frame $b^4$, and extending in a front to rear direction of the machine, is a series of nine rock shafts $b^5$, to-wit, one for each of the nine computer keys $b$. These rock shafts, at their forward ends, are provided with gears $b^6$, that mesh with the racks $b^2$ of the corresponding computer keys $b$, as best shown in Figs. 5, 9 and 10. The rock shafts $b^5$ are given return movements, and the computer keys are yieldingly held upward, by coiled torsion springs $b^7$ attached to the respective shafts and to the adjacent side of the frame $b^4$. As shown, the return movements of said rock shafts, under the tension of their springs, $b^7$, are limited by stops $b^8$ and $b^9$, respectively, on said rock shafts and on said frame $b^4$, (see Figs. 9 and 36).

Nine parallel so-called "unit bars" $b^{10}$ are located within the rectangular frame $b^4$ and extend transversely of the machine, being spaced apart from front to rear of the machine, distances which represent units of movement of the register wheels $a$. See Figs. 5, 6, 9, 10 and 11. These unit bars $b^{10}$ are supported from the rectangular frame $b^4$, by bell cranks $b^{11}$, mounted on transverse rods $b^{12}$, supported by the frame $b^4$. The upper arms of the bell cranks $b^{11}$ are connected by tie bars $b^{13}$. With these supports, when one of the tie bars $b^{13}$ is moved toward the left, with respect to Figs. 6, 9 and 10, the corresponding connected unit bar $b^{10}$ will be forced downward, to effect the setting of one of the unit pins of a preliminary representation device presently to be described. Each tie bar $b^{13}$ carries a spring pressed pawl $b^{14}$, the free end of which normally stands in position to be engaged by a cam $b^{15}$ on the corresponding rock shaft $b^5$. By reference to Figs. 6 and 9 it will be noted that the cams $b^{15}$ are located on a line extending diagonally across the rectangular frame $b^4$, and that the spring pressed pawls $b^{14}$ are located at different longitudinal points on the respective tie bars $b^{13}$, so that they are brought into the proper coöperative relation with respect to said cams. With this construction, when one of the computer keys is depressed, nearly or quite to its limit, the corresponding rock shaft $b^5$ will be given approximately one half of a complete rotation, in the direction of the arrow marked on Fig. 10. Under such movement, the cam $b^{15}$ of the rotated shaft will be carried into engagement with the coöperating pawl $b^{14}$, and act on said pawl to move the corresponding tie bar endwise and will force its way past said pawl, thereby permitting said depressed unit bar $b^{10}$ and tie bar $b^{13}$ to return to their normal positions, in advance of the return movement of the key and the corresponding rock shaft and cam. Each unit bar is given its return or upward movement and is normally yieldingly held upward by a coiled spring $b^{16}$ which connects the same to its overlying tie bar $b^{13}$. (See Figs. 9 and 10.)

By reference to Fig. 10 it will be seen that approximately a little less than one half of a complete rotation of the rock shaft $b^5$ is required to bring its cam $b^{15}$ into action on the coöperating pawl $b^{14}$. The purpose of this feature will appear later on in the description of the multiplication devices. The cams $b^{15}$ are constructed with a circumferential groove in which the tie bars $b^{13}$ work, the object being to prevent said tie bars from getting away from the action of the cams $b^{15}$ on the pawls $b^{14}$, (see Fig. 34).

By reference to Figs. 14, 15 and 16, it will be seen that the computer keys $b$ are provided with hooks $b^{17}$ that hook over the key levers of the corresponding numeral keys 6 of the typewriter, in such manner that when one of the computer keys $b$ is depressed, the corresponding numeral key 6 will also be depressed and caused to actuate the printing mechanism of the typewriter. The said numeral keys 6, however, when depressed, will not depress or act upon the corresponding computer keys, and hence the said numeral keys 6 may be used, at any time, to print numerals, without operating the computing mechanism. When a computer key is struck a hard blow and the finger is very quickly removed therefrom, there is a tendency for the corresponding numeral key 6 to be thrown ahead of the struck computer key and thereby to print the numerals on the sheet of paper in the typewriter, even when the computer key does not move far enough to actuate the computing mechanism. To overcome this, and to directly lock the computer keys $b$ to the corresponding numeral keys 6, for synchronous movements, when the former are struck, the key levers of the said numeral keys 6 are provided with projecting fingers $6^a$ that normally stand out of engagement with, but in position to engage with the hook $b^{17}$ of said computer keys $b$. By reference to Fig. 14 it will be seen that the lock finger $6^a$ normally stands far above the horizontal line drawn through the pivotal support or fulcrum of the key 6, so that when the two keys are moved downward, the finger $6^a$ will overlap the upper portion of the hook $b^{17}$ and interlock the keys $b$ and 6, as clearly indicated in Fig. 15.

*Decimal order or register bars, preliminary representation devices, or unit pins, operating carriage and associated parts.*—Attention is here particularly called to Figs. 5, 6, 11 and 12. Extending from front to rear of the machine, below the so-called "unit bars" $b^{10}$, and hence, at right angles to the latter, are independently movable, so-called "decimal order" or register bars $c$, of which there are in the machine illustrated, ten, that is, one for each register wheel $a$, except the one of highest decimal order. The number of these bars represents the number of columns of figures which may be added together, and such number may, of course, be varied in different machines. From the right toward the left, with respect to Fig. 6, the said register bars stand successively for the units, tens, hundreds columns and so on.

At their forward ends, the register bars $c$ have toothed rack portions $c^1$ that mesh with the gears $a^2$ of the respective register wheels $a$. Also at their forward ends, said register bars are formed with longitudinal slots $c^3$ that adapt said bars to slide and work pivotally on oscillatory fulcrum blocks $c^4$ mounted on a rod $c^5$ supported by the two bearing plates 34. At their rear portion, the register bars $c$ are normally supported by a vertical bearing plate $c^6$, secured to the bottom of the case 31, and slotted so as to guide and space the rear ends of said bars. Secured to the upper portion of the bearing plate $c^6$ is a stop plate $c^7$. The register bars $c$ are provided with notches $c^8$ which permit said bars, when in normal position, to be raised to the position indicated by dotted lines in Fig. 11. Said stop plate limits the upward movements of said register bars, under the action of the rotary selector; and, when said bars are moved forward, they are held against vertical movements, when their set unit pins are restored to normal positions. At their extreme rear ends, the register bars are formed with under cut shoulders $c^9$ for a purpose which will presently appear. Each register bar carries a series of nine vertically movable unit pins $c^{10}$ that are frictionally supported thereby, both when in raised and when in lowered positions. Preferably the unit pins are formed of spring metal strips folded together to give them a frictional engagement with their seats in the register bars. When the register bars $c$ stand in normal positions, the unit pins $c^{10}$ thereof stand directly under the respective unit bars $b^{10}$, as best shown in Figs. 5 and 11, but lie far enough below the same so that the depressions of the said unit bars will not engage the respective unit pins, unless the rear portion of a register bar has been raised, as indicated by dotted lines in Fig. 11, in which case, however, the depression of any unit bar will force downward into "set" position, the corresponding unit pin of the raised bar.

An operating carriage, so-called, made up of a pair of laterally spaced rack bars $c^{11}$ and transverse connecting bars $c^{12}$, $c^{13}$ and $c^{14}$, is mounted to move within the case 31 from front to rear thereof, see particularly Figs. 5, 8, 11 and 13. The racks $c^{11}$ are preferably mounted to run on ball bearings $c^{15}$ interposed between the same and the bottom of the case 31, as best shown in Fig. 13.

The carriage bar $c^{12}$ hereinafter designated as a push bar, normally stands a little rearward of the rearmost line of unit pins $c^{10}$, with its forward and upper edge at such elevation that when the carriage is moved forward, it will pass under the lower ends of such of the unit pins as have not been forced downward or "set", (see Fig. 11) but will engage with any and all of the unit pins of the several register bars which have been forced downward or set. As is evident, when the register bars are moved forward, into action on the register wheels, under the forward movement of the carriage and by the action of the push bar $c^{12}$ on the set unit pins, the said bars will be given differential movements, unless unit pins of like value have been set on all of the register bars. Under return movement of the operating carriage, the carriage bar $c^{13}$, engages the shouldered forward ends of the register bars and returns them to their normal positions indicated in Figs. 5 and 11.

Mounted in suitable bearings on the bottom of the case 31, is a countershaft $c^{16}$ having at its ends pinions $c^{17}$ that mesh with the teeth of the rack bars $c^{11}$ of the operating carriage. Overlying the countershaft $c^{16}$ is an operating shaft $c^{18}$ that is journaled in suitable bearings in the sides of the case 31, and, at one end, is provided with a segmental spur gear $c^{19}$ that meshes with one of the pinions $c^{17}$ of said countershaft. (See Fig. 13.)

13.) At its other end, the shaft $c^{19}$ projects through the case and is provided with an operating lever $c^{20}$. The construction described is best illustrated in Figs. 3, 5, 6 and 13.

As is evident, with the connections just described, a forward movement of the operating lever $c^{20}$ will throw the operating carriage forward, and, conversely, a rearward movement of said lever will move the said carriage rearward.

The complete rotary movement which, as already stated, is imparted to the shaft $a^{14}$, and toothed arms $a^{15}$, in the direction indicated by the arrows in Figs. 42, 43 and 44, takes place under a return movement of the operating carriage and hand levers. This action is accomplished by a pinion $c^{47}$ on said shaft $a^{14}$ that meshes with an intermediate gear $c^{48}$, which, in turn, meshes with the left hand rack bar $c^{11}$ of the operating carriage, as best shown in Figs. 6 and 31. The pinion $c^{47}$ is free to rotate on the shaft $a^{14}$, in the direction of the arrow marked thereon in Fig. 31, under the forward movement of the operating carriage; but, when said pinion is rotated in a reverse direction, it is clutched to said shaft, by a spring pressed ball clutch $c^{49}$ and thus imparts one complete rotation thereto, in a direction reverse from that indicated by the arrow in Fig. 31 and in the direction indicated by the arrows in Figs. 42, 43 and 44.

To insure complete movements of the operating lever and operating carriage, a so-called "full stroke device" illustrated in Figs. 13, 25 and 26, is provided. This device comprises a segmental two way ratchet wheel $c^{21}$, secured on the shaft $c^{19}$, near one side of the case 31, and provided at the terminations of its toothed segment with tripping shoulders $c^{22}$. Pivoted to one side of the case 31, below the ratchet wheel $c^{21}$, is an oscillatory pawl support $c^{23}$ that carries a pair of pawls $c^{24}$. The pawls $c^{24}$ are normally held, against stops $c^{25}$ on the supports $c^{23}$, by means of a light coiled spring $c^{26}$. The pivoted support $c^{23}$ is provided with an arm $c^{27}$ that is subject to a flat spring or frictional clamp $c^{28}$ secured to the side of the case 31, (see Figs. 25 and 26) which clamp yieldingly holds the support $c^{23}$ in either of the two positions in which it may be set. By oscillatory movements of the support $c^{23}$, the pawls $c^{24}$ are alternately thrown into action on the teeth of the segmental ratchet wheel $c^{21}$. When the pawls are positioned, as shown in Fig. 25, the operating lever $c^{20}$ can be moved forward only or in the direction indicated by the arrow marked thereon in the said view. When the lever and the operating carriage are moved to the extreme forward positions, the forward trip shoulder $c^{22}$ strikes the forward pawl $c^{24}$ and oscillates the support $c^{23}$ into the position indicated in Fig. 26, thereby throwing the forward pawl into action. When this action takes place, the said lever and carriage can be moved rearward, but must make complete rearward movements before they can again be moved forward.

Such unit pins $c^{10}$ as have been pressed downward or set, in one operation, must be restored to normal position before starting a new line. This is accomplished by a simple device. As best shown in Figs. 5, and 8 and 11, $c^{29}$ is a transversely extended pin restoring blade, the shaft $c^{30}$ of which is journaled in bearings $c^{31}$ on the bottom of the case 31. At one end, the shaft $c^{30}$ is provided with a depending lug $c^{32}$ which stands in the path of movement of a spring pressed actuating pawl $c^{33}$ pivotally mounted on the left hand member of the carriage rack bars $c^{11}$. The said pawl $c^{33}$ normally stands as shown in Fig. 5, and is so arranged that, under a forward movement of the operating carriage, it will engage but yield and pass under said lug $c^{32}$, but, under an initial return movement of said carriage, will positively engage said lug, thereby throwing upward the resetting blade $c^{29}$ and causing the same to force upward, to normal position, the set unit pins, which, at such time, are alined in a horizontal row directly over the said blade $c^{29}$. The pin restoring blade $c^{29}$ is yieldingly held, in its normal position, by a spring $29^c$ attached to a depending arm of its shaft $c^{30}$ and to a fixed base of reaction, as shown in Figs. 8 and 25.

Overlying the rear ends of the register bars $c$ are a series of individual spring fingers $c^{34}$ that tend to yieldingly press the bars downward. At their forward ends, these springs $c^{34}$ are attached to the upper portion of the slotted bearing plate $c^6$; and, at their free rear ends, they directly engage the upper rear portions of their respective register bars. At their intermediate positions, towards their forward ends, said register bars $c$ work in grooves cut in the upper edge of a fixed spacing bar $c^{35}$ which has a plurality of cavities containing light coiled springs $c^{36}$. Each of these springs $c^{36}$ engage with their respective register bars and should be of such tension that they will nearly, but not quite, support the weight of the respective register bars. To adjust the tension of the springs $c^{36}$, set screws $c^{37}$ are screwed through the bottom of the spacing bar $c^{35}$ and into the lower ends of the several spring seats. The spring fingers $c^{34}$ should be so arranged that their tension will exert very slight force on the register bars when the latter are in their lowered positions, but will exert considerable force thereon when the said bars are raised as shown by dotted lines in Fig. 11. The purpose of the springs $c^{34}$ and $c^{36}$ will be fully given later on.

Connections for returning the typewriter carriage toward the right, to an initial or starting position, by the operating lever $c^{20}$, are best shown in Figs. 1, 2, 3 and 6. A flexible connection $c^{38}$ is attached to the free end of the typewriter line feed lever 12, and is passed over a guide sheave $c^{39}$ mounted on the typewriter frame 1, and is then passed downward and secured to a grooved slack take up wheel $c^{40}$ mounted on the right hand side of the computer case 31. This take up wheel carries a pinion $c^{41}$ that meshes with a segmental gear $c^{42}$ which, in turn, is loosely mounted on the right hand end of the operating shaft $c^{18}$ and outside of the computer case 31. A segmental stop plate $c^{43}$, which has a notched peripheral flange, is rigidly secured to the hub of the segmental gear $c^{42}$. A torsion spring $c^{44}$ (see Fig. 6) is secured at one end to the stop plate $c^{43}$ and at its other end to the side of the case 31, and exerts a strain which tends to rotate the take up wheel $c^{40}$, as indicated by the arrow marked thereon in Fig. 3, in the proper direction to take up the slack of the flexible connection $c^{38}$. The tension of this spring is less than sufficient to overcome the spring 13 of the line feed lever 12, and is, of course, very much less than sufficient to overcome the spring 19 of the typewriter carriage driving mechanism.

Mounted for pivotal movements on the lever operated shaft $c^{18}$ is an adjustable stop arm $c^{45}$ that is capable of being sprung laterally so that it may be engaged with any one of the notches in the flange of the segmental stop plate $c^{43}$. Mounted for sliding movements on the operating lever $c^{20}$ is a driving bar $c^{46}$ that is frictionally held in any position in which it may be set. When the driving bar $c^{46}$ is forced downward, it stands in a position of engagement with the projecting outer end of the stop arm $c^{45}$, but when said bar is forced upward, it stands in such position that, under a forward movement of the operating lever, it will clear the said stop. With this construction it is evident, that when the driving bar $c^{46}$ is forced downward into a position for engagement with the free end of the stop arm $c^{45}$, and the operating lever $c^{20}$ is moved forward, it will positively return the typewriter carriage to a predetermined, but variable initial or starting position, depending on the position in which the said stop arm $c^{45}$ is set with respect to the notched segment $c^{43}$. It is also evident, that when the said stop arm is set as shown in Fig. 3, the forward movement of the operating lever will move the typewriter carriage to an extreme position toward the right, and that the distance that the typewriter carriage will be moved toward the right, under a forward movement of the operating lever, will be decreased accordingly as the stop arm $c^{45}$ is set in a notch further down on the stop plate $c^{43}$.

*Decimal order or register bar selector and associated devices.*—This group of mechanism includes a decimal order selector, the best form of which is a rotary shaft, drum or other carrier, having spirally arranged tappets. It also involves connections between the tappet shaft and the typewriter carriage whereby its step by step rotary movement will be controlled by the typewriter carriage escapement. It further involves register bar lifting levers and latches, whereby under the action of the rotary selector, the register bars $c$ will be raised into positions to present their unit pins $c^{10}$ to any depressed unit bar, one at a time, from the left toward the right, to-wit, in the order of succession, in which the figures are printed on the paper in the typewriter.

For the construction which will now be described, see particularly Figs. 4, 5, 6, 11 and 12, 21 to 24 inclusive, and Figs. 30, 46 and 47. The reference $f$ indicates the tappet shaft of the decimal order selector, and which is provided with spirally arranged tappets $f^1$. At one end, the tappet shaft $f$ is provided with a head $f^2$, having a plurality of dowel pins. At its other end, said shaft is recessed, to receive the projecting end of a spring-pressed trunnion $f^3$ that is yieldingly mounted in a suitable seat formed in one side of the case 31, as best shown in Fig. 21. The trunnion $f^3$ supports one end of said tappet shaft. To support that end of the tappet shaft which has the head $f^2$, the dowel pins thereof are inserted into seats formed in the back of a beveled gear $f^4$, that is carried by a countershaft $f^5$ mounted in one side of the case 31 and in a bearing 35 on the bottom of said case. With this construction, it is obvious that the selector can be moved lengthwise by hand, against the tension of the spring seated trunnion $f^3$, so as thereby, to bring the dowels of the head $f^2$ out from their seats in the gear $f^4$; and, then by taking hold of the outer end of the trunnion $f^3$, which will then be projecting beyond the casing, the trunnion can be pulled out to its limit so that the shaft $f$ will be completely uncoupled therefrom. Hence, it is obvious that the selector can thus be uncoupled from its supports, and be removed from the machine at the will of the operator. The purpose is to permit the interchangeable use of different selectors, having different arrangements of the tappets $f^1$ or different kinds of tappets according to the class of work intended to be done. For example, the two different forms of selectors illustrated, to-wit, one form in Figs. 21, 22 and 46, and the other in Figs. 23, 24 and 47, may be interchangeably used. The shaft $f^5$ carries a spur pinion $f^6$, which meshes with a spur gear $f^7$ carried by the spring-inclosing barrel $f^8$, and, as shown, is loosely journaled on a short countershaft $f^9$, mounted in suitable bearings on the case 31. The gear $f^7$, and its barrel $f^8$, are put under strain to move in the direction of the arrow marked thereon in Fig. 18 by a motor spring $f^{10}$, secured at one end to said barrel $f^8$, and at its other end, to the shaft $f^9$. The tension of the spring $f^{10}$ is regulated in the same well known manner as the typewriter carriage driving spring 19. With this additional motor spring for the computer, no additional power is required from the carriage driving spring 19, to actuate the selecting devices of the computer; and for this reason the tension of said spring 19 requires no change, whether the typewriter carriage and computer are connected or disconnected.

Mounted in the bearing 35, and in the bearing bracket 36, on the typewriter frame, is a vertical shaft $f^{11}$, having at its upper end, a miter gear $f^{12}$, and having at its lower end, a beveled pinion $f^{13}$, which latter meshes with the beveled gear $f^4$ on the countershaft $f^5$. See particularly Figs. 4, 27, 28 and 29. The miter gear $f^{12}$ meshes with a miter gear $f^{14}$ that is rigidly secured to a countershaft $f^{15}$, mounted in upwardly extending prongs of the bearing brackets 36. Mounted to freely rotate and slide on the countershaft $f^{15}$ is a wide faced pinion $f^{16}$ that remains in mesh with the typewriter carriage driving gear 18, heretofore described. This pinion $f^{16}$, and the pinion $f^{14}$, are provided with co-operating half clutches $f^{17}$.

The sliding pinion $f^{16}$ is adapted to be moved so as to engage and disengage the half-clutches $f^{17}$, and thereby couple the tappet shaft of the rotary selector to the typewriter carriage. This sliding movement of the pinion $f^{16}$ is accomplished by a so-called "switch key" $f^{18}$, which has a finger $f^{21}$ that engages the grooved hub of said pinion. The beveled pinion $f^{14}$ has a notched flange $f^{19}$, and the rear end of the switch key $f^{18}$ is bent laterally, and is provided with pins $f^{20}$ that work through one of the prongs of the bracket 36, and are adapted to engage with the notches of said flange $f^{19}$ when the half clutches $f^{17}$ are separated, to thereby lock said pinion $f^{14}$ and the rotary tappet shaft against movement, under the tension of the motor spring $f^{10}$, when said tappet shaft is disconnected from the typewriter carriage (see Fig. 29). The forward end of the switch key $f^{18}$ works through a slot in a plate $1^a$, secured to the forward portion of the typewriter frame 1, and is provided with two notches $f^{22}$, either of which is adapted to be engaged with said plate, as shown in Fig. 27, to hold said switch key in either of its two positions.

At the rear ends of the register bars $c$, is a series of register bar latches $f^{23}$ that are pivoted at their lower ends on a rock shaft $f^{24}$, mounted on the case 31. See particularly Figs. 4, 11, 12 and 30. The rock shaft $f^{24}$, together with laterally spaced heads $f^{25}$ and a tie rod $f^{26}$, which parts are rigidly connected, constitute a rocking frame, supporting the latches $f^{23}$, and register lifting levers. (See particularly Figs. 4 and 11.) On the rod $f^{26}$ is pivoted a series of register bar lifting levers $f^{27}$ of which there is one for each register bar. These lifting levers $f^{27}$ at their rear ends, are provided with laterally projecting studs $f^{28}$ that normally stand each within the path of movement of one of the spirally arranged tappets $f^1$ of the rotary selector. These lifting levers at their forward ends, are provided with laterally projecting lips $f^{29}$ that underlie the respective register bars, see Figs. 8, 11 and 12.

The latches $f^{23}$ are provided with pins $f^{30}$ that project at one side, for engagement with shoulders $c^8$ of the respective register bars, and project on the other side for engagement with tripping fingers $f^{31}$, carried by the respective lifting levers $f^{27}$, see particularly Figs. 11 and 30. By reference to Fig. 30, it will be seen that the arrangement just described is such that when the rear end of one of the lifting levers $f^{27}$ is pressed downward, by one of the tappets $f^1$, it will raise the rear end of the corresponding register bar into a position in which it will be caught and held by the corresponding latch, and that its finger $f^{31}$ will engage the pin $f^{30}$ of the latch of next higher decimal order and will force said latch backward, and release and drop the register bar of next higher decimal order than that which is being lifted into position for the setting of one of its unit pins.

Just outward of the lifting lever $f^{27}$ which lifts the register bar representing the units order, is an extra lever, which is indicated by the same numeral and which is in all respects like the said lifting levers except that it has no bar engaging lip $f^{29}$. There is an extra tappet $f^1$ in the spirally arranged series of tappets of the shaft $f$ for action on this extra lever. The only function of this last noted lever, is to trip the latch which acts to hold up the register bar of the lowest, or units order.

A transversely extended and vertically adjustable stop rod $f^{32}$ limits the downward movement of the forwardly projecting ends of the levers $f^{27}$. The latches $f^{23}$ are put under tension to move forward by light coiled springs $f^{33}$. The rearward movements of said latches are limited by a stop bail $f^{34}$, supported from the upper portion of the bearing $c^4$. Set screws $f^{35}$ work through the bottom of the case 31 and engage the rear portions of the heads $f^{25}$ of the oscillating frame and afford means for adjusting said lifting levers $f^{27}$, so that their studs $f^{28}$ will be brought into the proper relation with respect to the ends of the tappets $f^1$. (See Fig. 11.)

A torsional spring $f^{36}$, (see Figs. 4 and 6) on the shaft $f^{24}$ reacts against the bottom of the case 31 and against one of the heads $f^{25}$ and yieldingly holds the oscillating frame supporting the levers $f^{27}$, in the normal position best shown in Figs. 5 and 11. Secured to and for rotation with the beveled gear $f^4$, which drives the tappet shaft, is a ratchet wheel $f^{37}$ that is normally engaged by a retaining dog $f^{38}$. (This dog $f^{38}$ has a tail extension that is subject to an arm $f^{39}$ secured on the shaft $f^{24}$ of the oscillating frame, in such position that when said lever supporting frame is rocked forward, to carry the lifting levers $f^{27}$ out of the zone of action from the tappets $f^1$, said pawl will be forced out of engagement with the teeth of said ratchet wheel, as best shown in Fig. 5, but also in Figs. 6 and 7. On the forwardly projecting portion of the right hand head $f^{25}$ of the oscillating frame, is a roller $f^{40}$, (see Figs. 3 and 25) that is subject to cam surface $f^{41}$ on the right hand rack bar $c^{11}$ of the operating carriage. This cam surface $f^{41}$ is such that when the operating carriage is in normal or idle position, to-wit, in its rearmost position, the said oscillating frame under the tension of its spring $f^{36}$, will be held in its normal position with the lifting levers $f^{27}$ within the zone of action of the tappets $f^1$, but when said operating carriage is moved forward, its initial movement will cause the cam surface $f^{41}$ to press the roller $f^{40}$ downward and thereby rock the oscillating frame forward and carry the register bar lifting levers $f^{27}$ out of the zone of action of the tappets $f^1$. This action is very important because, under a forward movement of the operating carriage, the tappets $f^1$ are turned backward and must not, of course, at such times, be permitted to act upon the said lifting levers. It will thus be seen that simultaneously with the movement of the lifting levers out of the zone of action of the tappets $f^1$, the retaining dog $f^{38}$ is released from the ratchet wheel $f^{37}$, thereby making it possible to impart return movements to the typewriter carriage and to the rotary tappet shaft, or selector, under a forward movement of the operating lever $c^{20}$ and of the operating carriage which is moved by said lever. It will now be understood that the retaining dog $f^{38}$ makes it impossible to return the typewriter carriage and the rotary selector, while said selector and typewriter are coupled together, except by a movement of the hand lever $c^{20}$, and thereby preventing the return of the typewriter carriage without actuating the computing mechanism.

For action on the latches $f^{28}$, to insure the releasing thereof, there is an auxiliary latch trip which is common to all of said latches and is preferably in the form of a bail $f^{42}$, (see Figs. 4, 5, 6 and 11). The shaft $f^{43}$ of this trip bail $f^{42}$ is journaled in the sides of the case 31 and is provided, near its left hand end, with an arm $f^{44}$ that is loosely coupled to another arm $f^{45}$ of a rock shaft $f^{46}$. The rock shaft $f^{46}$ extends in a direction from front to rear of the machine, is journaled in the rectangular frame $b^4$ and is provided with a bail $f^{47}$ that stands in position to be engaged and actuated by the movements of any of the upper arms of bell cranks $b^{11}$, supporting the tie bars $b^{13}$, whenever rocked by the depressions of the computing keys. A torsion spring $f^{41}$ on the shaft $f^{43}$ yieldingly holds the trip bail $f^{42}$ in normal position. It will thus be seen that the movement of any one of the unit bars will, through the connections just described, oscillate the latch tripping bail $f^{42}$ rearward and cause the same to force into a normal or inoperative position, any of the latches $f^{23}$ that happens to be set, thereby insuring the return to normal position of any latched up register bar, in advance of the movement of the register bar selector. Attention may here be called to the fact that the said auxiliary latch trip or bail is thus thrown into action, under downward movement of one of the computer keys, whereas the movement of the rotary register bar selector does not take place until the depressed key makes its upward or return movement. Preferably, the adjustment between the latch trip $f^{42}$ and the latches is such that the said trip will be thrown into action on the latches, only when the parts are given considerable momentum by quick strokes on the keys. The selector actuated lifting levers $f^{27}$ will trip the latches and drop the bars in ample time, when the keys are not struck in a very rapid order of succession, but the auxiliary trip arranged to operate from the keys, in advance of the movement of the selector, is required to make the machine capable of very high speed key action. The purposes of the springs $c^{34}$ and $c^{86}$ may now also be stated. The said latter springs $c^{86}$, it will be remembered, have a tension which is but little less than that which is required to lift the rear ends of the register bars $c$. Hence, the work required of the tappets $f^1$ in their actions on the lifting levers, is made very light. The springs $c^{34}$, on the other hand, operate much quicker than gravity, but cooperate therewith to throw downward the rear ends of the register bars when they are released from their latches and, furthermore, they act with greatest intensity under the initial downward movements of the bars and under a decreasing force as said bars are moved downward to normal positions.

Again, the springs $c^{30}$ have a reverse action, that is, they operate with greatest force, when the said bars are in their lowermost positions and with a force that is decreasing when the bar is raised. In short, the springs $c^{34}$ are for the purposes of high speed and the springs $c^{30}$ are for the purposes of reducing the work of the register bar selector to a minimum.

Under the initial forward movement of the operating carriage, and simultaneously with the release of the retaining dog $f^{38}$ from the ratchet wheel $f^{37}$, and the rocking of the lever support to carry the lifting levers $f^{27}$ out of the zone of action of the tappets $f^1$, the auxiliary trip bail $f^{42}$ is automatically thrown into action, and caused to release any set latch, by means of a device shown in Fig. 25. This device comprises a bell crank lever $f^{48}$ that is pivoted to the right hand side of the case 31. The lower arm of this bell crank is subject to a raised cam $f^{49}$ on the right hand carriage rack bar $c^{11}$, and the upper arm thereof acts upon an arm $f^{50}$, that depends from the right hand end of the trip bail shaft $f^{48}$. The reference $f^{51}$ indicates a roller, mounted on one side of a bearing extending upward from the bottom of the case 31, and which overlies the rear end of the right hand rack bar $c^{11}$ and prevents the rear end of said rack bar from rising off from its track.

The forwardly projecting arm of the right hand head $f^{25}$ of the oscillating frame, to which the roller $f^{40}$ is applied, is connected, by a link $f^{52}$, to the lever of the tabulating key 8, (see Figs. 3, 6 and 25). This link $f^{52}$ is notched at $f^{53}$ for engagement with a lateral projection on the end of a short arm $f^{54}$ that projects forwardly from the shaft $f^{48}$ of the auxiliary latch tripping bail $f^{42}$, already described. With this connection, whenever the tabulating key 8 is depressed, it will force the link $f^{52}$ downward and will simultaneously actuate the auxiliary latch tripping bail $f^{42}$ and rock the lever supporting frame forward and carry the register bar lifting levers $f^{27}$ out of the zone of action on the tappets of the rotary selector, during the rapid movement of said selector which takes place when the tabulating key is depressed to set the typewriter carriage in position for tabulated work.

By reference to Fig. 25 it will be seen that the lower end of the link $f^{52}$ is pronged to embrace a stud $f^{55}$ on the head $f^{25}$, so that when the oscillating frame is moved, by a forward movement of the computer operating carriage, the tabulating key 8 will not be drawn down.

To indicate the progressive action of the decimal order selector on the register bars and register bar latches, during unit pin setting action, there is provided a so-called "decimal order indicator". This decimal order indicator is afforded by a plurality of light and long rods $f^{56}$, (see Figs. 2, 5, 6 and 11) which rods are pivotally attached, at their rear ends, to their respective register bar latches $f^{23}$, and, at their forward ends, they work through a perforated guide bar $f^{57}$, which, as shown, overlies the register wheels $a$ and is supported from the bearing plates 34. The indicator rods $f^{56}$ are of such length that they project forward through the guide bar $f^{57}$ only when their respective latches are moved forward. Hence, as is evident, when one of the rods $f^{56}$ projects forward through the guide bar $f^{57}$ over its respective indicator wheel, it indicates the decimal order or denomination of the register bar $c$ which is raised into position for the setting of its unit pins, under the action of the decimal order selector. Said rods $f^{56}$ are moved forward under the tension of the coiled springs $f^{33}$, acting on the latches $f^{23}$.

*Key protector.*—This device is best shown in Figs. 1, 2, 5, 6 and 18. It consists primarily of a transverse key protecting bar $g$ which, as shown, is carried by arms $g^1$ on a rock shaft $g^2$ mounted in suitable bearings on the top of the computer case 81. The protecting bar $g$ is thus mounted to move from the position indicated by full lines, into the position indicated by dotted lines, in Fig. 18. When it stands in its full line position, it overlies the finger pieces of the typewriter numeral keys 6 and prevents the same from being accidentally struck by the fingers, but does not prevent downward movements of the said numeral keys, when the corresponding computer keys $b$ are depressed. When the said bar $g$ stands in the position indicated by dotted lines in Fig. 18, and by full lines in Fig. 5, it underlies shoulders formed by the heads of the computer keys and positively lock said computer keys, in such manner that they can not be depressed. A torsional spring $g^3$, secured at one end to the shaft $g^2$ and at its other end to a fixed base of reaction, puts the protector bar $g$ under strain to move from the position indicated by dotted lines, into the position indicated by full lines in Fig. 18. At or near its left hand end, (see Figs. 18 and 19) the shaft $g^2$ is provided with two depending arms $g^4$ and $g^5$. Pivoted to the left hand side of the case 31 is a long lock lever $g^6$, the forward end of which is adapted to be engaged with a notch in the end of the arm $g^4$, as shown in Fig. 5, to thereby positively hold the protector bar $g$ in position to lock the computer keys $b$. The rear end of said lock lever 6 is yieldingly pressed downward by a spring $g^7$. Pivoted to the forward end of the lock lever $g^6$ and working through the top of the case 31, is a trip key $g^8$, by means of which the forward end of the lock lever $g^6$ may be depressed, at will, to thereby release the protector bar $g$ and permit the same to be moved by the spring $g^3$, from its computer key locking position into a position over the numeral keys of the typewriter. By pressing forward on the protector bar $g$, it may, at any time, be moved from its full line position in Fig. 18 into its dotted line or computer key locking position. The above movements of the key protector or protecting bar $g$, are automatically accomplished, in the operation of the machine.

On the segmental gear $c^{19}$ is a pin or projection $g^6$, which, when said gear has been given nearly its complete movement in the direction of the arrow marked thereon in Fig. 18, under a forward movement of the operating carriage and its lever $c^{20}$, will strike the arm $g^5$ and positively force the protector bar $g$ into its computer key locking position, in which position it will, as before stated, be locked by the lock lever $g^6$.

On the barrel $f^8$ of the spring driven gear $f^7$, (see Figs. 6, 18 and 20) is a lug $g^{10}$, which, under a movement of the said gear in the direction indicated by the arrow marked thereon in Fig. 18, engages with the rear end of the lock lever $g^6$, raises the same, and releases the depending arm $g^4$ on the rock shaft $g^2$ which carries the arms $g^1$ and protector bar $g$. The timing of the parts is such that the lug $g^{10}$ will be brought into action on the lock lever $g^6$ and effect the release of the key protector, so that the latter will be thrown into its full line position in Fig. 18 and thereby release the computer keys, at a time just before the first tappet $f^1$ is brought into action upon its coöperating lifting lever $f^{27}$. This key protector therefore locks the computer keys $b$ while the numeral keys 6 of the typewriter are uncovered and adapted to be directly actuated, and releases the said computer keys and covers said numeral keys 6, at a time when it is desirable to use the said computer keys $b$. Under a reverse or return movement of the gear $f^7$, the lug $g^{10}$ engages the laterally bent rear end of the lock lever $g^6$ and cams itself past the said lever, without imparting vertical movement to the said lever.

In the standard typewriter key board, it is customary to use letter "L" key to print the numeral "1". In the key board illustrated in the drawings, a numeral key for the numeral 1 is located in line with the other numeral keys, but it has been found desirable to provide means for locking the letter "L" key when the alined row of numeral keys are protected from accidental operation by the protector bar $g$. This is accomplished, in a simple manner, by providing the rock shaft $g^2$ with an upwardly extended arm $g^{11}$, which, when the protector bar is in full line position, Fig. 18, engages under a stud or projection $g^{12}$ on the key lever of the said letter "L" key, (see Figs. 2, 18 and 19).

*Error correcting device.*—For the construction of this device see Figs. 5, 6, 7, 8 and 11. The reference $k$ indicates a pair of laterally spaced levers pivoted, at their intermediate portions, on a rod $k^1$ supported by the bearing plates 34. These levers are connected at their rear ends by a plate $k^2$ which underlies all of the unit pins $c^{10}$, when the register bars are in normal positions. This plate $k^2$ has a lateral projection $k^3$ (see Fig. 8) that normally underlies the single pin of a so-called "zero bar", hereinafter described. The forward ends of the levers $k$ are connected by a cross bar $k^4$, which together with said levers $k$ and the plate $k^2$, constitute a rectangular frame. The normal position of this rectangular frame and its co-acting devices is best seen in Figs. 5 and 11.

In the cover of the machine, directly above the forwardly projecting portion of the cross bar $k^4$, is located a spring held key $k^5$. When in normal position, (see Fig. 5) there is an open space between the lower end of said key and the cross bar $k^4$, permitting the bar $c^{13}$, of the operating carriage, to pass through, to the end of its forward movement. If an error is made and discovered before the operating carriage has been brought into action, the same may be corrected by pressing down the key $k^5$, which forces down the forward ends of the levers $k$ and raises their rear ends and the plate $k^2$ until the latter comes into contact with and forces upward into normal position all of the set unit pins $c^{10}$ of the register bars. The wrong figure, on the paper in the typewriter, is erased in the customary manner of correcting errors in typewriting and thereafter the typewriter carriage is reset in its proper position, and the whole line of figures, to be added, is rewritten, by striking the correct computer keys, which will also set the correct pins in the register bars. If an error is made in the middle of a line, for example, and discovered at once, a register bar will be found in its raised position, and all the bars having their pins set are subject to an upward motion under the upward pressure of the pin resetting plate $k^2$ on the set unit pins.

To prevent such upward motion and to cause the raised register bar to fall down, a double bail is provided, the arms $k^6$ of which are pivoted on a rod $k^7$ in ear lugs $k^8$ on the rear side of the register bar supporting guide plate $c^6$. The rear ends of said arms $k^6$ extend upwardly and rearwardly and the rod $k^9$, which connects the same, overlies the rear ends of all the register bars $c$, and, in its normal position, is located a little forwardly of the latches $f^{25}$. The tie rod $k^{25}$ which connects the forward ends of the arms $k^6$ is embraced by the slotted rear ends of the levers $k$. When the error correcting key $k^5$ is pressed down and the rear ends of the bars $k$ are forced upward, the motion is transmitted to the double bail, the tie rod $k^9$ will force back any latch $f^{23}$ which may be set for holding a register bar in its raised position, letting down such raised bar; and a further downward motion of the rod $k^9$ will bring it in contact with the upper rear edges of the register bars and cause a downward pressure thereon at the same moment that the plate $k^2$ is exerting an upward pressure on the lower ends of the set unit pins in the register bar, thereby preventing the bars from being raised by the frictional contact between them and the pins when the latter are pushed up.

*Multiplication devices.*—These devices are shown throughout Figs. 2, 5, 6, 7, 9, 10, 25, and 31 to 38 inclusive. The transverse upper bars $c^{14}$ of the operating carriage are grooved to receive the ribs of a sliding block $p$ of a so-called "multiplying controller". Mounted to move vertically in this block $p$ is a multiplicity of multiplication pins $p^1$. These pins are arranged in rows in two directions, as clearly shown in Fig. 7. The pins $p^1$ constitute preliminary representation devices that are adapted to be set to represent any multiplicand and to be subsequently brought into action on the register bars, to actuate the register. The rows of pins $p^1$ that extend in a front to rear direction, and hence parallel to the register bars $c$, represent different decimal orders, and the pins in the several rows represent units of the several denominations, or decimal orders. The pins $p^1$ of this multiplying controller are, by the common carrier or block $p$, held in a fixed relation with respect to each other, except that they are free for vertical movements. They are, as shown, encircled and frictionally held either in raised or in lowered positions, by small spring rings $p^2$, interposed between upper and lower sections of the block $p$ in recesses made in the lower section for that purpose. The transverse rows of the pins $p^1$ are located on such lines that even when depressed, they will pass between the transverse rows of unit pins $c^{10}$ of the register bars $c$ (see Figs. 7, 34 and 35); and to afford clearance for the upper ends thereof, during actuating movements, the unit bars $b^{12}$ are constructed with teeth or projections $10^b$ on their lower edges, as shown in Fig. 10, with spaces between for the pins $p^1$ to pass through. There must be nine pins $p^1$ in each longitudinal row. As shown, there are eight of these longitudinal rows of pins extending parallel with the register bars, but the number of rows may be varied. The longitudinal rows of pins $p^1$ must be spaced apart such distances that when the multiplying controller is moved into position over the register bars, said longitudinal rows of pins will stand longitudinally alined with push lugs $p^3$ offset laterally from and secured to the respective register bars $c$, as best shown in Figs. 7, 11, 34 and 35. These push lugs $p^3$ are alined transversely of the machine when the register bars are in normal or idle position. When the multiplying controller is thus positioned, with its pins alined with the register bar push lugs $p^3$, and one pin in each longitudinal row is set or depressed, and when said multiplying controller is then moved bodily forward, by a forward movement of the operating carriage and its hand lever, the set pins $p^1$ will pass freely between the longitudinal rows of unit pins $c^{10}$, and will be brought into action on the respective push lugs $p^3$, thereby imparting register actuating movements to the several register bars, variable according to which of the unit representing pins $p^1$ are set. If no unit pin in some particular longitudinal row has been depressed, the corresponding register bar will not be moved from its normal position under a forward movement of the multiplying controller, because the pins $p^1$ in their normal uppermost positions indicated in Fig. 34, will pass over and clear the said push lug $p^3$ of the register bar $c^1$, as clearly shown in Fig. 34. In this multiplying controller, the set pins $p^1$ act as drivers on the lugs $p^1$ of the register bars, and hence the most forward unit pins $p^1$ represent nine units, while the most rearward of said pins represent one unit of movement of the register bars and register wheels. This is a reverse arrangement from that of the unit pins $c^{10}$ which are driven members and are gathered up and moved by the driving bar $c^{12}$ of the operating carriage.

When the multiplying controller is out of action, it stands in a position at one side of the register bars $c$, and preferably at the right thereof, as shown in Fig. 7. When the same is to be used, the multiplying controller is moved step by step, from its inoperative position shown in Fig. 7, into position over the register bars, by a hand rotated shaft $p^4$ mounted in suitable bearings on the bottom of the computer case 31 and extending from front toward the rear of the machine. On this shaft $p^4$ are mounted spur pinions $p^5$ that mesh with racks $p^6$, formed on the lower edge portions of the controller block $p$. Between the pinions $p^5$ is a roller $p^7$, to which said pinions are rigidly attached, so as to move as one part. By means of spline and feather connections the roller and pinions are locked to the shaft $p^4$ for rotary movements, when the shaft is turned, but free to slide longitudinally on the shaft, when the multiplying controller is oscillated forward and backward by the operating carriage, through the oscillations of the hand lever $c^{20}$. When the computation has been completed, the controller block is returned to initial position by turning shaft $p^4$ to the right and as the pins are moved over the roller $p^7$ they are pushed upward to their normal positions (see Fig. 33). At its forward end, the shaft $p^4$ is shown as provided with an operating knob $p^8$ which, if desired, may be made detachable, so that it may be moved out of the way when not in use.

Arrangement is made whereby the pins $p^1$ of the multiplying controller may be set by the unit bars $b^{10}$, under manipulation of the computer keys $b$. In making this provision, a series of nine supplemental rock shafts $p^9$ are mounted in the rectangular frame $b^4$, parallel with, and one adjacent to, each of the rock shafts $b^5$ before described. These supplemental rock shafts $p^9$ are also mounted for endwise movements and they are subject to torsion springs $p^{10}$ that tend to rock the same and to force them rearward into positions best shown in Figs. 9 and 10. At their forward ends, the rock shafts $p^9$ are provided with arms $p^{11}$ that are normally held against the vertical front bar and overlying flange of the frame $b^4$, as best shown in Figs. 9 and 10. The racks $b^2$ of the computer keys $b$ are provided with rearwardly projecting studs $p^{12}$ that normally stand free of, but close to, the free ends of the arms $p^{11}$, and are operative thereon, when the said shafts are forced forward, as will presently appear. Each supplemental rock shaft $p^9$ carries a hammer $p^{13}$, so-called. The free end of these hammers $p^{13}$ normally stand in positions just above, but laterally out of line with, the several unit bars $b^{10}$, and the several hammers are located on a diagonal line so that one hammer is arranged for coöperation with each of the unit bars. By reference to Fig. 9 it will be noted that the series of hammers $p^{13}$ is arranged on a diagonal line that intersects the series of unit bars at a reverse angle from the line on which the series of cams $b^{15}$ intersect the said bars. This reverse arrangement, it will be understood, is due to the fact, already noted, that the pins $p^1$ of the multiplying controller act on the register bars as driving members, whereas the unit pins $c^{10}$ of the register bars are acted upon as driven members. Hence, of course, it follows that when the unit bars $b^{10}$ are used to set the pins of the multiplying controller, the most forward unit bar, which operates to set the most forward of the said pins $p^1$, represents nine units, whereas, when used to set the unit pins $c^{10}$ of the register bars, it is the most rearward of the unit bars that operates to set the unit pins $c^{10}$ having a value of nine.

The bodies of the unit bars $b^{10}$ are located directly above the transverse rows of unit pins $c^{10}$ of the register bars, and between the transverse rows of pins $p^1$ in the multiplying controller, as shown in Figs. 34 and 35, and when depressed, do not interfere with the pins $p^1$ when the controller $p$ is in its idle position (Fig. 7), but pass down between the rows. To make the unit bars $c^{10}$ effective on the pins $p^1$, said bars are provided with laterally offset pin-setting lugs $p^{14}$, that are alined with each other in a line parallel to the shaft $p^4$, and located to the left of the center line of said shaft such distance that the first step of rotary movement of said shaft to the left will bring the first or left hand longitudinal rows of pins $p^1$, in the multiplying controller, directly below said lugs $p^{14}$ of the unit bars, whereby a pin $p^1$ can be pushed down, or set. For each step of rotary movement of the shaft $p^4$ to the left, a new longitudinal row of pins $p^1$ comes successively under the lugs $p^{14}$ (see Figs. 6 and 33). To render the unit bars effective to set the pins of the multiplying controller, the several supplemental rock shafts $p^9$ are simultaneously moved forward, so as to throw their arms $p^{11}$ under the studs $p^{12}$ of the key racks $b^2$, and to throw the free ends of the hammers $p^{13}$ over the respective unit bars $b^{10}$.

To accomplish the simultaneous endwise movements of the supplemental rock shafts $p^9$, a shaft $p^{15}$ is mounted on the rear of the frame $b^4$, and is provided with fingers $p^{16}$ that engage, one with the rear end of each supplemental rock shaft $p^9$, as best shown in Figs. 9, 34, 35 and 36. The shaft $p^{15}$ is also provided with a rearwardly projecting finger $p^{17}$. On the rear end of the shaft $p^4$ is a cam disk $p^{18}$ (see Figs. 6, 31 and 32), which has a single notch that normally engages with a head on one arm of the bell crank $p^{19}$, the other arm of which engages with the finger $p^{17}$ of the shaft $p^{15}$.

When the multiplying controller is in its inoperative position, shown in Figs. 6 and 7, the headed end of the bell crank $p^{19}$ engages with the notch of the disk $p^{18}$, and the springs $p^{10}$ then hold the supplemental rock shafts $p^9$, and parts carried thereby, in their inoperative position, best shown in Fig. 9. When, however, the multiplying controller is moved toward the left, or toward its operative position, the cam disk $p^{18}$ operates on the bell crank $p^{19}$, rocks the fingered shaft $p^{15}$, and forces the supplemental shafts $p^9$ endwise toward the front of the machine, thereby carrying their arms $p^{11}$ under the key studs $p^{12}$, and moving their hammers $p^{13}$ over the respective unit bars $b^{10}$ (see particularly Fig. 35).

The parts being adjusted as just above stated, the initial downward movement of any one of the computer keys $b$ will rock the corresponding supplemental shaft $p^9$, and throw its hammer $p^{13}$ into action on the particular unit bar $b^{10}$ which is arranged to set pins in that row of the multiplying controller which has a register-actuating value of that represented by the depressed computer key. Only a very slight downward movement of the computer key is required to effect the setting of the pins $p^1$ of the multiplying controller, and such key movement is not sufficient either to cause the typewriter type bars to print or to throw the cams $b^{15}$ into engagement with the respective pawls $b^{14}$ of the tie bars $b^{13}$. As shown in Fig. 7, the block $p$ of the multiplying controller is provided with perforations $p^{20}$ that afford clearance for the register bar unit pin-setting portions, or teeth $10^b$ on the lower edges of the unit bars $b^{10}$, when the latter are forced downward so as to throw their lugs $p^{14}$ into action on the pins $p^1$ of the multiplying controller.

To indicate the position of the multiplying controller, with respect to the decimal order register bars, and register wheels, there is provided a so-called "position-indicator". This position indicator (see particularly Figs. 2 and 6), involves an indicator wheel $p^{21}$, which is mounted on a bearing bracket 37, and has a gear $p^{22}$ secured to its hub, which gear meshes with a gear $p^{23}$ carried by the shaft $p^4$. The gear $p^{22}$ is larger than the gear $p^{23}$, so that more than a complete rotation of the shaft $p^4$ is required to impart one complete rotation to said indicator wheel $p^{21}$. On the shaft $p^4$, just forward of the bracket 37, is a notched disk $p^{24}$, the notches of which represent different step-by-step positions of the multiplying controller in its movements transversely of the machine, to-wit, to and from its operative positions. The retaining dog $p^{25}$, which is subject to a spring $p^{26}$, is pivoted to the bracket 37, and is provided with a head that engages with the depressions or notches of the disk $p^{24}$, to hold the multiplying controller in any position in which it may be set, under such strain that considerable force is required to move the same. The said notched disk and pawl serve to accurately hold the multiplying controller in its several positions during its actuating movements on the register bars.

Rotatively mounted on the register shaft $a^1$ is a plurality of multiplier indicating wheels $p^{27}$ (see Figs. 6, 7, 38 and 39), which wheels, as shown, are provided each with ten peripheral teeth, and the peripheries of which are marked with the successive digits 0 to 9 inclusive. In the machine illustrated, there are eight of these wheels $p^{27}$, but this number may be varied. Spring fingers $p^{28}$, secured to the bottom of the computer case 31, engage the teeth of the respective wheels $p^{27}$, and hold the same in any one of the positions in which they are set. These indicator wheels are arranged to be operated by a push finger $p^{29}$, which is carried by the block $p$ of the multiplying controller. The arrangement is such that each forward movement of the multiplying controller, when in position to engage the register bars, will cause the push finger $p^{29}$ to engage its alined indicator wheel $p^{27}$, and impart one step of movement thereto. Thus, if the said multiplying controller and operating carriage are moved forward five times, the indicator wheel with which the push finger is alined will be given five steps of movement, and the movement will be registered on the indicator wheel. For each successive step of movement of the multiplying controller, from right toward the left, or transversely of the register bars, the push finger $p^{29}$ will be moved into alinement with the indicator wheels $p^{27}$ to the left, in succession. Hence the series of indicator wheels $p^{27}$ will register the number of times that the multiplying controller has been thrown into action in each series of the denominational orders, according to the unit and decimal values of the digits of the multiplier.

Each indicator wheel $p^{27}$ is provided with in its hub with a single notch or ball pocket $p^{30}$, which coöperates with a spring-pressed ball $p^{31}$ mounted in the shaft $a^1$ in such manner as to permit the said wheels to be freely rotated, in advance of said shaft, in the direction of the arrow marked thereon in Fig. 39, but to cause the said shaft, when rotated, to drive the said wheels in the direction of said arrow. These parts $p^{30}$ and $p^{31}$ relate to the zero devices, which will be fully described later on.

As already indicated, the rock shafts $p^9$ are provided for the purpose of shifting the key action on the unit bars $b^{10}$, as required for different kinds of computation. The same result may be accomplished by providing the finger pieces of the computer keys with an additional series of numerals representing the value of the keys and their corresponding unit bars $b^{10}$, when used for multiplication, viz., the "1" key could be provided with the additional numeral "9", the "2" key with the additional numeral "8", and so on through all the digit keys, but such arrangement is likely to cause confusion in operation, for which reason the construction shown is preferred.

The first indicating wheel $p^{27}$ to be actuated by push finger $p^{29}$ varies with the variation of the number of figures in the multiplicand, and in reading the registration, all wheels to the right of the one first actuated are ignored.

*Zero devices.*—For turning the register wheels $a$ to zero, after a column has been added, and for returning the said register wheels $a$ and the multiplier indicating wheels $p^{27}$ to zero, in performing multiplication, after the product has been read and printed on the paper in the typewriter, there is provided a "zero bar" $t$, so-called, which is located parallel with, and just to the left of, the register bars $c$, and like the said register bars, is mounted to slide from front to rear of the machine, and is adapted to be raised and lowered at its rear end. This zero bar is provided with a single vertically movable pin $t^1$, which is located rearward of the rearmost transverse row of unit pins $c^{10}$, as best shown in Figs. 7, 11 and 12, and directly underlies the projecting lug $t^2$ on the rearmost of the two carriage bars $c^{14}$. At its forward end, the zero bar $t$ has rack teeth $t^3$ that mesh with a pinion $t^4$ on the register wheel shaft $a^1$, (see particularly Figs. 7 and 37). A spring-pressed ball clutch $t^5$ causes the pinion $t^4$ to drive the shaft $a^1$ in the direction indicated by the arrow marked thereon in Fig. 37, but permits the pinion to rotate in the reverse direction while the shaft stands still; and furthermore, permits the shaft to be rotated in the direction indicated by said arrow without rotating said pinion; the latter feature being for a purpose which will presently appear.

When the rear end of the zero bar $t$ is raised, while said zero bar is in normal position, its pin $t^1$ will be forced against the lug $t^2$ and will be depressed with respect to said bar $t$. To raise the rear end of the unit bar $t$, as just described, and to effect the setting of its pin $t^1$, the key lever $t^6$ is provided. This lever is, as shown, pivotally supported at $t^7$ to the left hand bearing plate 34, and its rear end is bent laterally so that it underlies the said zero bar $t$. At its forward end, the said lever $t^6$ is subject to a spring-held key $t^8$ mounted to move vertically through a bearing in the case 31, (see Figs. 5, 8 and 37). The said pin $t^1$ is so set that its lower end will be engaged by the push bar $c^{12}$ on the operating carriage. The maximum movement imparted to the register wheels by the register bars $c$, under a forward movement of the operating carriage, is nine steps of movement, or nine-tenths of a complete rotation, but the pin $t^1$ is located one unit of movement farther back than the rearmost row of unit pins $c^{10}$, so that the push bar $c^{12}$, acting on the depressed pin $t^1$ under a forward movement of the carriage, will cause the zero bar to impart ten units of movement, or one complete rotation, to the gear $t^4$ and register wheel shaft $a^1$.

The zero bar $t$, like the register bars $c$, receives its return movement to normal position under a return movement of the operating carriage, and under the direct action of the transverse carriage bar $c^{13}$. The pin $t^1$, like the set up pins $c^{10}$, is restored to normal position, under an initial return movement of the operating carriage, by the upward movement of the pivoted pin-resetting blade $c^{20}$.

Each register wheel $a$, in its hub, has a single notch or ball pocket $t^9$ that is adapted to be engaged by a spring-pressed ball $t^{10}$, (see Figs. 40 to 44, inclusive), which, when the shaft $a^1$ is rotated under the forward movement of the zero bar $t$, as just described, will engage and positively drive the register wheels in the direction indicated by the arrows marked thereon in the views just noted, but will permit the said register wheels to freely rotate in the direction noted while the said shaft is standing still. The clutch $t^9$—$t^{10}$ for the right hand or unit denomination wheel is so arranged, that under a forward movement of the said zero bar, and one complete rotation of the shaft $a^1$, said wheel will be left standing with its zero mark exposed to the sight opening 32. The said clutches of the register wheels of higher decimal order, however, are so arranged that under the above noted movement of the zero bar and the shaft $a^1$, these wheels $a$ will be left standing with their numeral 9 exposed at the sight opening. This latter feature is because of the fact that under the return movement of the operating carriage, the carrying mechanism of the register will be thrown into action, and will impart one step of movement to each of the said register wheels of higher denomination than that of the unit order, and thereby move such wheels from their ninth unit position to their tenth, or zero, position.

Before the zero bar $t$ can be used for the purposes above indicated, the multiplying controller must be moved to its inoperative position toward the right, and this movement causes the roller $p^7$ to restore the pins $p^1$ to normal positions, thereby destroying the representation of the multiplicand on said multiplying controller.

In multiplication, it is often desirable to multiply a certain multiplicand, in succession, by several different multipliers; and it is desirable, in order to save time, to perform this series of multiplications without destroying or resetting the multiplicand on the pins $p^1$ of the multiplying controller. Hence there is provided a secondary zero device, which device is best shown in Figs. 6 and 31. On the left hand end of the register shaft $a^1$ is a spur pinion $t^{11}$ that is coupled to said register shaft $a^1$ by a spring-pressed ball clutch $t^{12}$, which clutch permits said shaft to be freely rotated in the direction of the arrow marked on said pinion in Fig. 31, but causes the said pinion, when rotated in the direction of said arrow, to rotate said shaft with it. On the carrying shaft $a^{14}$ is a spur pinion $t^{13}$, of the same size and character as the pinion $t^{11}$, and which, like said pinion $t^{11}$, is coupled to the shaft $a^{14}$ by a one-way clutch, not shown, but which will permit said shaft $a^{14}$ to be freely rotated in the direction of the arrow marked thereon in Fig. 31, but will cause said pinion, when rotated in the direction of said arrow, to rotate said shaft $a^{14}$ with it. The character $t^{14}$ indicates a segmental spur gear, which is rigidly mounted on a shaft in suitable bearings on the left hand side of the case 31, and bearing plate 31°. Said spur gear $t^{14}$ is located between the pinions $t^{11}$ and $t^{13}$, and the outer end of its shaft is provided with a knob $t^{15}$, by means of which it may be rotated, at will, in the direction of the arrow marked thereon in Fig. 31. The gear $t^{14}$ has teeth that extend approximately half way around the same, and the rest of its periphery is left smooth for engagement with the toothless peripheral sections $t^{16}$ and $t^{17}$ respectively of the pinions $t^{11}$ and $t^{13}$, and holding each of the pinions locked when not engaged and rotated by the teeth of the driving segmental gear $t^{14}$. With this construction, the register wheels $a$, and the multiplier indicating wheels $p^{27}$, will be set in their zero positions by one complete rotation of the segmental gear $t^{14}$. The first half of this rotation throws the teeth of said gear into action on the pinion $t^{11}$, thereby imparting one complete rotation thereto and setting the multiplier indicating wheels $p^{27}$ and the unit member of the register wheels $a$ in their zero positions; and the second half rotation of said gear throws the teeth thereof into action on the pinion $t^{13}$; thereby imparting one complete rotation thereto and to the carrying shaft $a^{14}$, and causing the carrying mechanism of the register to move the register wheels of higher denomination than the unit order from their "9" position to their "0" position. Thus, by this secondary zero device, the register wheels and the multiplier indicating wheels may be set to zero positions, without in any way affecting the set pins $p^{1}$ or destroying the representation of the multiplicand on the multiplying controller. When the carrying shaft $a^{14}$ has finished its complete rotation, all the multiplier indicating wheels stand at "0", and are held there by their springs $p^{28}$ with sufficient resistance to notify the operator of the completed rotation of the segmental spur gear $t^{14}$. If the zero key is depressed by mistake, such action can be negatived by depressing the error-correcting key, which will force the laterally offset portion $k^{3}$ of the unit pin resetting plate $k^{2}$ (see Fig. 8) upward, thereby returning the pin $t^{1}$ in the zero bar to its normal position, in the same manner that the unit pins in the register bars are restored to normal positions.

The decimal order selector illustrated in Figs. 21 and 22 and the diagram Fig. 46, has its tappets $f^{1}$ arranged on an unbroken spiral line, and, hence, will have a selecting action in respect to the register bars at every movement of the typewriter carriage; and it further follows that a combined typewriting and computing machine provided therewith, will be adapted to produce on the printed page so-called "solid" work, like this: 3578423. The decimal order selector illustrated in Figs. 23 and 24 and in the diagram 47, has its tappets arranged on offset or staggered spiral lines, with double spaces in the direction of the movement of the selector between the staggered sets of tappets, so as to permit the typewriter carriage to make one step of movement without any selecting action on any of the register bars by said decimal order selector; and therefore it follows that a combined typewriting and computing machine provided with this form of selector, illustrated in Figs. 23, 24, and diagram 47, will be adapted to produce "punctuated" work, or, otherwise stated, the listed number on the printed sheet, may be like this: $35,784.23.

Operation.

The actions of the various groups of mechanism, and their relations to each other, have now been considered; but to make the use of the machine, in performing computations, more fully understood, the following concrete illustrations are given:

*Addition.*—Assuming that the register bar selector $f$ stands in the position shown in Fig. 5, ready to throw up the register bar of the highest denominational order, at its first movement, and that the typewriter has been used for work independent of the computer, the typewriter carriage is first set in such position that the figures to be recorded on the paper will be printed thereon in the desired column spaces. Then connect the typewriter carriage with the selecting mechanism of the computer, by lifting up the shift key $f^{18}$ out of engagement with the plate $a^{1}$ one the frame $l$ of the typewriter, and push it backward until the forward notch $f^{22}$ in said key can engage with the plate $l^{4}$, which movement will cause the loose member of the clutch $f^{17}$ to interlock with the other member thereof, so that, when the carriage is moved in either direction, the rotary selector moves synchronously therewith. If, for instance, the number 919 is to be added, the typewriter carriage is set in the proper position, either by the use of the tabulating, or the space bar, mechanism of the typewriter. If the latter was used, the selector will have lifted the several register bars $c$, representing higher denominations than those to be brought into action in this instance, and tripped them down again, so that, when the carriage comes to a stop, the register bar representing the hundreds denominational order is in its raised position and held there by its co-acting latch $f^{24}$; and the indicating rod $f^{36}$, connected to said latch, is then moved forward so that its forward end sticks out through the casing directly above its corresponding register wheel, representing the hundreds order.

If the tabulating key was used to position the parts, none of the register bars will have been lifted up during the movement of the carriage and selector, because the selecting levers $f^{27}$ on the rocking frame were removed out of the zone of action of the tappets of the selector, until the carriage stops. But, when the pressure on the tabulating key is removed, the rocking frame springs back to normal position, and the carriage and selector move one step further, in a well known manner, and the register bar, representing the hundreds denominational order is in the raised position for action thereon by the computer keys. As already described, under its proper heading, the key protector is so timed, with respect to the action of the selector, that the computer keys are unlocked just at the moment the said selector assumes the position shown in Fig. 5, leaving the computer keys free for action thereon by the operator. The computer key "9" being now struck, in the ordinary manner for typewriting, the rock shaft connected with said key turns until the cam $b^{16}$ thereon acts on the pawl $b^{14}$, carried by the tie bar $b^{13}$, forcing it leftwards, and through the bell cranks $b^{11}$ connected with its unit bar $b^{10}$, forces the latter downwards and strikes the unit pin, representing "9" in the raised register bar, thereby setting the said pin in position for coöperation later on with the computer operating carriage. After the unit pin has been set, the cam $b^{16}$ on the rock shaft $b^5$, under the continued downward motion of the key, passes by the pawl $b^{14}$ on the tie bar $b^{13}$, releasing the pawl from the action of the cam, and thereby permitting the tie bar and its connected unit bar to return to normal positions, under the tension of their spring $b^{16}$. When, later, the key returns, under the tension of the spring $b^7$ on the rock shaft, the cam on said rock shaft passes freely under the pawl on the tie bar. Towards the end of the downward movement of the key, its corresponding tie bar forces the bell crank supporting it left hand end, against the upper rod of the bail $f^{46}$—$f^{47}$, and rocks it; and said bail being directly connected to the latch trip $f^{48}$ transmits its rocking motion to the latter, thereby tripping the latch from its register bar supporting position. The register bar thus released from its latch, falls down to normal position, and its downward movement is accelerated by its overlying spring finger $c^{24}$, thereby insuring against possible interference of a subsequently operated unit bar, which interference might otherwise occur during very rapid operation of the machine. The operation of the latch trip is so timed that the unit pin in the register bar is set before the latch is tripped and the register bar falls down.

The construction of the computer key, as already described, is such that its downward movement also forced down its corresponding typewriter key, whereby the type bar is impelled towards the platen and prints the numeral "9" on the paper. As soon as the key begins its upward movement, the typewriter carriage, under its driving and escapement mechanism, moves one step to the left, ready for the next imprint on the paper; and the rotary selector has then lifted the next register bar, or the one representing the tens order, to its raised position, the "1" key is then struck, the result being that the unit pin, representing "1" in the raised register bar is forced down, or set, and the actions of the various parts are repeated in the manner described in connection with the "9" key, whereby the last register bar, representing the units order is left in its raised position, ready for the action of the "9" key, which is now operated the second time, thereby setting the unit pin, representing "9" in the said last register bar. The sum "919" has now been printed on the paper and set up on the preliminary representation devices. The operating lever should now be pulled forward as far as it can come, and this action turns the main shaft $c^{18}$; and the segmental spur gear $c^{19}$ thereon in mesh with the gear on the shaft $c^{18}$, transmits motion to the operating carriage and moves the same forward. The push bar $c^{12}$ on said carriage, in the rear of the unit pins in the register bars, moves with the carriage and intercepts the pins that have been set, and forces the register bars forward, the distance of the movements of the register bars being regulated by the set pins therein. The "9" pins will be intercepted first, and the "1" pin last, so that the operating carriage, during its forward movement, will move the register bars, having the "9" pins set, nine units of movements and the register bar, having its "1" pin set, will be given only one unit movement, and the unit movements of the register bars are transmitted to their corresponding register wheels, whereby the sum "919" appears on the said wheels at the sight opening provided therefor. On the return movement of the operating carriage, the bar $c^{18}$ located at the front end thereof, does not immediately begin to push the register bars rearward, but allows the pin restoring blade $c^{26}$ to be rocked, whereby the set unit pins, gathered in a horizontal row above said blade, are pushed up to their normal positions in advance of the returning movements of the register bars.

Through the connections between the operating lever and the typewriter carriage and the paper feeding devices thereon, already fully described, the paper has, under the operation just described, been fed for line spacing and the carriage returned to desired initial positions, and all the different parts are now ready for beginning operations anew for the next line. If now the number "81" is to be added to the first line, the typewriter carriage must be positioned so that the "8" will be printed in the same column as the "1" of the first number, or as here shown:

919
81
———
1000 after which the keys and operating lever are operated in the same manner as in the first number.

It will be noticed that when the above two numbers are added together, the operation involves the carrying of tens from the lower to the higher denominations, which is accomplished as follows: The operating carriage through the rack portion of its left hand member meshes with the idle gear $c^{48}$, which, in turn, is in mesh with the one-way actuating pinion $c^{47}$ on the shaft $a^{14}$. During forward movements of the operating carriage, said pinion turns idly on its bearings, but on return movements of said carriage, the pinion engages with and turns the shaft one complete revolution, in the reverse direction of the arrow on said pinion (Fig. 31), together with the arms $a^{15}$ thereon, which will intercept and actuate any of the carrying wheels $a^9$—$a^{10}$ that have been set by any register wheel $a$, passing from its ninth to its tenth unit movement, thereby transmitting one unit movement to the adding wheel of the next higher denominational order, thus carrying the tens from a lower to a higher order.

As the typewriter is provided with a type character for printing a horizontal line, the key connected with said character is operated to print a line under the two numbers added together, whereafter the sum or total of said numbers is read at the sight opening, and thereafter it may be printed, if desired, from the numeral keys of the typewriter.

If a machine is provided with a decimal order selector, as illustrated in Figs. 23, 24 and 47, punctuation marks may be printed between columns, like this: 35,784.23, in the ordinary manner of typewriting; but if provided with the selector illustrated in Figs. 21, 22 and 46, the printed work will appear as "solid" matter, like this: 3578423. As illustrated, the selector is detachable, whereby it is an easy matter to substitute one kind for another, as the nature of the work may demand. The structure which permits said selector to be removed and another substituted, at will, has been fully pointed out in the detailed description heretofore given. As there is no restriction to the circumferential spacing of the tappets, selectors, with differentially spaced tappets, may be provided for any kind of spaced work that may be demanded. Further, a machine may be provided with duplicate sets of adding devices, whereby one set may be used for multiplication, and another set for addition, so that the products of a series of multiplication may be added together, and at the same time recorded on the paper in the typewriter.

*Multiplication.*—In a general way, the operation of multiplication has already been indicated: the same being, in substance, an addition of the multiplicand as many times as indicated by the multiplier. To illustrate more fully the use of the machine for this purpose, the operation of multiplying 78915 by 2506 will be followed through. The typewriter carriage may be connected with the register bar selector, or disconnected therefrom,—preferably the latter in a machine with only one set of adding devices.

The operator must see to it that the register bar selector stands in an inoperative position, with respect to the register bars, and the indicating rods $f^{36}$ will give the necessary notice, because, if a register bar is in its raised position, it will prevent free transverse movement of the multiplying controller. If the key protector is in a position whereby the computer keys are locked, the operator depresses the trip key $q^8$, thereby unlocking the computer keys. The next action is to take hold of the shift knob $p^8$ on the shaft $p^4$, at the front end of the computer, and turn it one step to the left, or sufficiently to disengage the friction pawl $p^{25}$ from one notch in the star wheel $p^{24}$ on said shaft, and to reëngage with the adjacent notch, to hold the shaft, and devices controlled thereby, temporarily in a new position. The turning of the shaft moves the multiplying controller one step to the left, whereby the unit pins in the highest denominational order are moved away from the pin-restoring roller $p^7$ sufficiently to be allowed to be set for coöperation with the register bars. The turning of the shaft also causes the cam $p^{18}$ on the rear end of said shaft, through the bell crank $p^{16}$, to rock the shaft $p^{15}$, thereby shifting the auxiliary rock shafts $p^9$, and the hammers $p^{13}$ thereon, into operative positions on the unit bars, and to become subjected to the key action.

The operator now depresses the computer key "7", and the stud $p^{12}$ thereon presses down the arm $p^{11}$ on the front end of its corresponding auxiliary rock shaft, and the hammer on said shaft strikes on top of its corresponding unit bar, and forces it downward sufficiently to set a pin $p^1$ in the multiplying controller. The finger of the operator is then removed from the key, and the shifting knob $p^8$ is turned another step leftward, thereby presenting the next denominational series of unit pins in the multiplying controller to the key action, and the key "8" is struck, the shift knob, and the keys "9", "1", "5", are alternately operated as before, until the multiplicand 78,915 has been set up on the multiplying controller. It will now be noted that the last denomination or row of pins in which a pin was set, is one step away from the unit or right hand register bar, and consequently, after the last key is operated, the shift knob $p^8$ is turned one additional step to the left, thereby bringing all of the set pins in the multiplying controller directly above their corresponding first series of register bars, or the first five bars counted from the right, and the multiplying controller is held in that position, in respect to movements widthwise of the machine, by the friction pawl $p^{25}$ and the star wheel $p^{24}$ on the shaft $p^4$.

The operator now oscillates the operating lever six times, as indicated by the unit value of the unit denomination of the multiplier, (2506), and the multiplicand has been transferred to the register six times, and the sum 473,490 appears at the sight opening thereof. The push finger $p^{29}$ on the multiplying controller has, during the oscillation of the lever, operated one of the multiplier indicating wheels $p^{27}$ six times, whereby the numeral 6 is shown at the sight opening for said wheels, the wheel operated on depending on the number of figures in the multiplicand, so that all wheels to the right thereof, must be ignored in this particular operation. The actuated indicator wheel always depends on the position of the multiplying controller and the push finger $p^{29}$, and the starting actuating position thereof varies with the variation in the number of figures in the multiplicand. After the six oscillations have been completed, the shift knob $p^8$ is again turned a step to the left, thereby bringing the set unit pins $p^1$, of the multiplying controller, to their second position, and ready to coöperate with the second series of register bars, according to the value of the tens order of the multiplier, which happens to be an "0", or nothing, and hence no oscillations are given to the operating lever and the register bars while the multiplying controller is in its second position; but instead, the shift knob is turned one step further, bringing the multiplying controller to its third position with respect to the register bars, or the position representing the hundreds order of the multiplier, and is left in this position while the operating lever is oscillated five times, thereby transferring the multiplicand five hundred times to the register wheels, in five operations, because the lowest denominational order effected is the hundreds. The push finger $p^{29}$ on the multiplying controller has then operated on the third multiplier indicating wheel, (third with respect to the first wheel operated by said finger) and the numeral "5" appears thereon. The multiplying controller is again shifted one step toward the left, by turning the knob $p^8$, thereby bringing said controller to its fourth operative position. Said controller is then oscillated two times, whereby the multiplicand is transferred two thousand times to the register wheels, and the fourth multiplier indicating wheel is thus moved two steps, so that the numeral "2" appears thereon. The product "197,760,990", now appears on the register wheels, and the multiplier appears on the indicating wheels, if the manipulations of the shift knob $p^8$ and the operating lever has been correctly performed. If the indicator wheels $p^{27}$ do not show the correct multiplier, the work has been incorrectly performed, and must be done over again.

The multiplying-controller position-indicating disk $p^{21}$ is not a necessary part of the mechanism, but is often found useful in case the operator is interrupted in the work, because it will indicate the denominations that will be affected by an oscillation of the operating lever, before such oscillation is made, whereas the multiplying indicating wheels will show the position afterward, but not beforehand.

After the multiplication is completed, the knob $p^8$ is turned to the right as far as it can go, the multiplying controller moves to the right, and the set unit pins thereon are pushed upward to normal positions, as they pass over the roller $p^7$ on the shaft $p^4$. If it is desired to multiply the same multiplicand with different multipliers, a saving of time is made possible by employing the secondary zero resetting device, whereby the register wheels and indicator wheels $p^{27}$ are returned to zero without removing the multiplying controller from its coöperative position with the register bars, thereby preventing the set unit pins in the controller from being restored to normal positions, and thus making it unnecessary to set up the multiplicand anew, for each change of multiplier.

The secondary zero or resetting device is operated by turning the knob $t^{18}$, on the left side of the computer, in the direction of the arrow on the gear $t^{14}$, Fig. 31, which, through the intermediate mechanism, resets both register and indicating wheels to "0" in the manner already described. The multiplying controller can now be shifted back to coöperative position with the lowest series of register bars, for the beginning of a new multiplication; and the multiplying controller position indicating disk $p^{21}$ serves to indicate the position of the controller, thereby relieving the operator of the necessity of keeping track of its various movements in order to know the position of said multiplying controller. The different zero resetting devices are so constructed that they cannot interfere with each other under any circumstances.

If desired, the multiplying controller can be moved to its extreme left hand position first and, after oscillating the operating lever, according to the digit value of the highest denominational order of the multiplier, it may be shifted to the right, step by step, or in reverse order to that previously described, and the results will be indicated correctly on the register and multiplier indicating wheels. In this order of manipulation, the naughts, on both sets of wheels, to the right of the last actuated wheels, must be eliminated by ignoring them, except where the right hand numerals of either the multiplicand or multiplier are naughts, in which case they must be included in the reading of the two classes of wheels.

What I claim and desire to secure by Letters Patent of the United States is as follows:—

1. The combination with a register, of a multiplying controller coöperating therewith and having adjustable register-controlling elements arranged in rows in two directions and adapted to be set to represent any multiplicand, the rows in one direction representing units and the rows in the other direction representing decimal orders, one of which coöperative devices, to-wit, the controller or the register, being capable of movement in two directions, the movement in one direction serving to position the parts for action on the register in different decimal orders, and the movement in the other direction being capable of repetition to actuate the register according to the units in the digits of the multiplier, substantially as described.

2. The combination with a register, of a multiplying controller movable as an entirety in two directions and provided with adjustable register controlling elements arranged in rows in two directions and adapted to be set to represent any multiplicand, the rows in one direction representing units and the rows in the other direction representing different decimal orders, the movements of said controller in one direction serving to position the same for action on the register in different decimal orders, and the movement thereof in the other direction being capable of repetition, to actuate the register according to the units in the digits of the multiplier.

3. The combination with a register and register bars, of a multiplying controller movable as an entirety in two directions and provided with adjustable register controlling elements arranged in rows in two directions and adapted to be set to represent any multiplicand, the rows in one direction representing units and the rows in the other direction representing different decimal orders, the movements of said controller in one direction serving to position the same to select the register bars of the desired decimal orders, and the movement thereof in the other direction being capable of repetition, to throw said register bars repeatedly into action on said register, according to the units in the digits of the multiplier.

4. The combination with a register, of a multiplying controller movable as an entirety in two directions for actuating said register and provided with adjustable register controlling elements arranged in rows in two directions, adapted to be set to represent any multiplicand, the rows in one direction representing units and the rows in the other direction representing different decimal orders, a single set of digit keys having connections for setting the elements of said controller, and means for transferring the multiplicand represented by the set of controlling elements, to actuate said register in different denominations, according to the units in the digits of the multiplier.

5. The combination with a register, of a multiplying controller movable as an entirety in two directions, and provided with adjustable register controlling elements, arranged in rows in two directions and adapted to be set to represent any multiplicand, the rows in one direction representing units and the rows in the other direction representing different decimal orders, manually operated means for moving said controller in one direction to position the same for action on the register in different decimal orders, and independent manually operated means for moving said controller in the other direction, to repeat the action thereof on the register, according to the units in the digits of the multiplier.

6. The combination with a register, of a multiplying controller movable as an entirety in two directions and provided with adjustable register controlling elements arranged in rows in two directions and adapted to be set to represent any multiplicand, the movements of said controller in one direction serving to position the same for action on the register in different decimal orders, and the movement thereof in the other direction being capable of repetition to actuate the register according to the units in the digits of the multiplier, and means for restoring the set elements of said controller to normal positions after they have been actuated to accumulate the product on the register.

7. The combination with a register and register bars, of a two-way movable multiplying controller having adjustable elements arranged in rows in two directions adapted to be set to represent any multiplicand, independent manually operated devices for imparting said two movements to said controller, the movement of said controller in one direction serving to select the register bars of the desired denominational orders, and the other movement thereof being capable of repetition to throw said register bars repeatedly into action on the wheels of the register, according to the units in the digits of the multiplier.

8. The combination with a register, of a multiplying controller movable as an entirety and provided with adjustable register controlling elements adapted to be set to represent a multiplicand and arranged in rows in two directions, the rows in one direction representing units and the rows in the other direction representing different decimal orders, means for transferring the multiplicand represented by the set controlling elements to the register, in different denominations, according to the units in the digits of the multiplier, and means for restoring the register wheels to zero without altering the multiplicand represented by the set elements of said controller, whereby any desired multipliers may be applied to any multiplicand without resetting the multiplicand on the controller.

9. The combination with a denominational order register, of a multiplying controller movable as an entirety in two directions, for actuating said register, and provided with adjustable register controlling elements adapted to be set to represent any multiplicand and arranged in rows in two directions, the rows in one direction representing units and the rows in the other direction representing different decimal orders, means for transferring the multiplicand represented by the set controlling elements to the register, in different denominations, and means for restoring the register wheels to zero independent of the position occupied by the multiplying controller and the register controlling elements therein, substantially as described.

10. The combination with a register and multiplier indicating wheels, of a multiplying controller movable as an entirety and having register controlling elements adapted to be set to represent any multiplicand, and arranged in rows in two directions, the rows in one direction representing units, and the rows in the other direction representing different decimal orders, means for transferring the multiplicand represented by the set controlling elements, to the register, in different denominations, and to actuate said multiplier indicating wheels, and means for restoring said register and said multiplier indicating wheels to zero, independent of the position of the register controlling elements, substantially as described.

11. The combination with printing devices adapted to write any desired words or numbers, of a computer having a denominational order register, preliminary representation devices adapted to be set, in advance, to represent any desired multiplicand, and means for moving said preliminary representation devices in two different directions, one of which movements positions said preliminary representation devices for action on the register in different decimal orders, and the other of which movements actuates the register and is capable of repetition, whereby the multiplicand can be transferred to the register according to the unit and decimal values of the different digits of the multiplier, substantially as described.

12. The combination with a typewriter, of a denominational order register a multiplying controller having key-set elements adapted to be set to represent any multiplicand, a carriage movable at will to cause the set controller to actuate the register, and means for moving said controller transversely of the movement of said carriage, to set the same to different denominational orders of said register.

13. The combination with a typewriter, of a denominational order register a multiplying controller having key-set elements adapted to be set to represent any multiplicand, a carriage movable at will, to throw the set controller into action on the register, and independent means, operated at will, for setting said controller to different denominational orders of said register.

14. The combination with a typewriter, of a denominational order register having numeral wheels, register bars coöperating with said numeral wheels, a multiplying controller having key-set elements adapted to be set for any multiplicand, a carriage, operative at will, for throwing the set controller into action on said register bars, to actuate the register wheels, and independent means for moving said controller transversely of said register bars, to set the same for action in different denominational orders thereof.

15. In a computer, the combination with digit keys and a register, of two sets of preliminary representation devices, for performing different kinds of computation, and a shift device for subjecting either of said two sets of preliminary representation devices to the action of said keys, at will.

16. In a computer, the combination with a register, of preliminary representation devices for addition, and preliminary representation devices for multiplication, and means whereby either of said two classes of preliminary representation devices may be caused to actuate said register, at will.

17. The combination with a register and digit keys, of preliminary representation devices for addition, preliminary representation devices for multiplication, and means whereby either of said two classes of preliminary representation devices may be set by said keys and subsequently caused to actuate said register.

18. The combination with a typewriter, of a computer having means coöperating with the typewriter, to print and add numbers, and also having a multiplying controller provided with adjustable elements arranged to be set to represent any multiplicand, means for transferring the multiplicand to said register, in one series of decimal orders, according to the unit and decimal value of one digit of the multiplier, and means for transferring said multiplicand to said register in other series of decimal orders, corresponding to the unit and decimal values of other digits in the multiplier, without resetting the multiplicand.

19. The combination with a typewriter, of a computer involving a register, register bars, means coöperating with the typewriter and said register bars, to actuate said register, in performing addition, and a multiplying controller adapted to be set for any multiplicand, and coöperating with said register bars, in performing multiplication.

20. In a computer, the combination with digit keys and a register, of several sets of preliminary representation devices, for actuating said register to perform different kinds of computation, unit bars for setting said preliminary representation devices, several sets of unit-bar-actuating elements, operative according to the kind of computation desired, and a shift device for rendering any set of said bar-actuating elements coöperative with the keys, at will.

21. In a computer, the combination with digit keys and a corresponding set of unit bars, of two sets of bar-actuating elements, interchangeably operative on said unit bars, under the key action, for performing different kinds of computations, and a shift device for rendering either of said two sets of bar-actuating elements coöperative with the keys, at will.

22. In a computer, the combination with digit keys and a corresponding set of unit bars, of two sets of rock shafts, interchangeably operative on said bars, under the key action, and a shift device for rendering either of said two sets of rock shafts operative on said bars, for performing different kinds of computations.

23. In a computer, the combination with a register, of two sets of preliminary representation devices for actuating said register, one set to perform addition, and the other set multiplication, unit bars for setting said preliminary representation devices, two sets of bar-actuating elements, and a common shift device, for throwing into coöperative action with the keys the proper set of said two classes of devices for the kind of computation desired.

24. In a printing and computing machine, the combination with keys for operating the printing mechanism and keys for operating the computing mechanism, of means for alternately protecting the one class of said keys from accidental operation while the other class of said keys is in condition for action.

25. In a printing and computing machine, the combination with keys for operating the printing mechanism and keys for operating the computing mechanism, with the latter arranged to operate the former, of means for alternately protecting the one class of said keys from accidental operation while the other class of said keys is in condition for action.

26. In a combined typewriter and computing machine, the combination with the numeral keys of the former and the computing keys of the latter, of connections whereby said typewriter numeral keys may be operated without operating said computing keys, a key protector operative, in one position, to lock said computing keys, and operative in another position to protect the typewriter numeral keys from accidental operation, but without locking the same.

27. In a printing and computing machine, the combination with keys for operating the printing mechanism and keys for operating the computing mechanism, of automatically actuated means for alternately protecting the one class of keys from accidental operation while the other class of keys is in condition for action.

28. In a combined typewriter and computing machine, the combination with the numeral keys of the former and the computing keys of the latter, of connections whereby said computing keys operate said numeral keys of the typewriter, but permit the latter keys to operate without operating said computing keys, a protecting bar overlying the finger pieces of said typewriter numeral keys, in one position, to prevent accidental operation thereof, and movable into another position to lock said computer keys, and automatic means for moving said bar alternately from one position to the other.

29. In a printing and computing machine, the combination with keys for operating the printing mechanism and keys for operating the computing mechanism, of a key protector for alternately protecting one class of said keys from accidental operation while the other class of said keys is in condition for action, key-controlled spring-power mechanism for automatically imparting one shifting movement to said key protector and independent means for imparting the other movement to said key protector.

30. In a printing and computing machine, the combination with keys for operating the printing mechanism and keys for operating the computing mechanism, which former keys are arranged to be operated by said latter keys, but are capable of actions independent thereof, of a protector movable from one position to another, to alternately protect the one class of keys from accidental operation while the other class of keys is in condition for action, key-controlled, spring-power mechanism operating to automatically move said key protector into position to protect the numeral keys of said printing mechanism, and manually operated means for moving said key protector into a position to lock the keys of said computing mechanism.

31. In a printing and computing machine, the combination with keys for operating the printing mechanism and keys for operating the computing mechanism, of a register, preliminary representation devices for actuating said register, means controlled by the keys of said computing mechanism for setting the said preliminary representation devices, a key protector, key-controlled spring-power mechanism for moving said key protector to protect the numeral keys of said printing mechanism, and a lever having connections for moving the said preliminary representation devices and for setting said key protector in a position to lock the keys of the computing mechanism.

32. In a printing and computing machine, the combination with keys for the printing mechanism and keys for the computing mechanism, of a key protector movable to alternately protect the one class of keys while the other class of keys is in condition for action, and a protector trip, operative at will.

33. In a printing and computing machine, the combination with keys for the printing mechanism and keys for the computing mechanism, of a key protector, means for automatically moving said protector to automatically protect the one class of keys from accidental operation while the other class of keys is in condition for action, means for locking said protector in one position, and a trip key, operative at will, for releasing said protector from its locked position.

34. In a computer, the combination with a register, register bars, register bar latches, and a register bar selector operative to subject said bars to their respective latches in succession, and a latch trip operative independently of the action of said selector.

35. In a computer, the combination with a register, register bars, register bar latches, and a register bar selector operative to subject said bars to their respective latches, in succession, and to trip the latches of next higher decimal order, in succession, of an auxiliary latch trip operative independently of said register bar selector.

36. In a computer, the combination with a register, register bars, register bar latches, and unit pins on said register bars, of means coöperating with the set unit pins for causing said register bars to actuate said register, a register bar selector, operative to subject said register bars to their respective latches, in succession, and to trip the latches of next higher decimal order, in succession and an auxiliary latch trip operative independently of said register bar selector.

37. In a computer, the combination with a register, of register bars having key set unit pins, means coöperative with the set unit pins for causing the register bars to actuate said register, latches for holding the register bars in position, for the setting of their unit pins, a register bar selector operative to subject said register bars to their respective latches, in succession, and to trip the latches of next higher order, in succession, and an auxiliary latch trip arranged to be operated independently of said selector.

38. In a computer, the combination with a register, and register bars having unit pins, of key-controlled unit pin setting means, means coöperating with the set unit pins for bringing said register bars into action on the register, latches for holding said register bars in position for the setting of their unit pins, a register bar selector, selector-actuated register-bar setting levers arranged to subject said register bars to the corresponding latches, in succession, and an auxiliary latch trip common to said latches.

39. In a computer, the combination with a register, of register bars having unit pins, key-controlled unit pin setting means, latches for holding said register bars in position for setting of their unit pins, a spring-power actuated, key-controlled register bar selector, selector-actuated register-bar setting levers, for subjecting the said register bars to said latches, in succession, and a latch trip common to said latches.

40. In a computer, the combination with a register, of register bars, register bar latches, and a register bar selector operative to subject said bars to their respective latches, in succession, of a latch trip arranged to be operated in advance of the bar selecting action of said selector, to make possible a high speed of the machine.

41. In a computer, the combination with register bars, register bar latches, a register bar selector operative to subject said bars to their respective latches, in succession, and to trip the latches of next higher decimal order, in succession, of an auxiliary latch trip arranged to be operated in advance of the bar selecting action of said selector, to make possible a high speed of the machine.

42. In a computer, the combination with register bars, register bar latches, and a register bar selector operative to subject said bars to their respective latches, in succession, and to trip the latches of next higher decimal order, in succession, of a key-actuated latch trip arranged to be operated in advance of the bar-selecting action of said selector.

43. In a computer, the combination with a register and keys, of register bars having key-set unit pins, means coöperating with the set unit pins for causing said register bars to actuate said register, a register bar selector operative to subject said register bars to their respective latches, in succession, and to trip the latches of next higher order, in succession, an auxiliary latch trip common to said latches, and key connections to said latch trip arranged to actuate said latch trip in advance of the bar selecting action of said selector.

44. In a computer, the combination with a register, register bars having unit pins, key-controlled unit pin setting means, latches for holding said register bars in position for setting of their unit pins, a selector operative to subject said register bars to their respective latches, in succession, and to trip the latches of next higher order, in succession, an auxiliary trip common to said latches, and key connections arranged to actuate said auxiliary latch trip in advance of the bar selecting action of said selector.

45. In a computer, the combination with a register, of register bars having keys and unit pins, key-controlled unit pin setting means, latches for holding said register bars in position for setting of their unit pins, a spring-power actuated, key-controlled register bar selector, selector-actuated register-bar setting levers for subjecting said register bars to said latches, in succession, a latch trip common to said latches, and key connections for tripping said latch in advance of the bar selecting movement of said selector.

46. In a computer, the combination with register bars having unit pins, of key-controlled unit pin setting means, means coöperating with the set unit pins for bringing said register bars into action on the register, latches for holding the register bars in position for setting of their unit pins, a spring-power actuated key-controlled register bar selector, selector-actuated levers arranged to subject the register bars, in succession, to their respective latches, and to release the register bars of next higher order from their respective latches, and an auxiliary latch trip common to all of said latches and arranged to be operated by the keys of the computer.

47. The combination with a register, of register bars having key-set preliminary representation devices, register bar latches, a register bar selector operative under upward movements of the keys to subject said register bars, in succession, to their respective latches, and a latch trip, operative under downward movements of the keys, to insure the release of the register bar latched under the last operation of said selector.

48. In a computer, the combination with a register, of register bars having key-set unit pins, register bar latches, a register bar selector arranged to be actuated under upward movements of the keys and operating to subject said register bars to their respective latches, one at a time, and to release those of next higher order, in succession, and a key-actuated auxiliary latch trip, operating under downward movements of the keys, to insure the dropping of any raised register bar.

49. In a computer, the combination with a register, register bars, register bar latches, and a register bar selector, operative to subject said bars to their respective latches, in succession, of a latch trip common to said latches and having an independent trip key, such as a tabulating key, for actuating the same.

50. In a computer, the combination with a register, register bars, register bar latches, and a register bar selector, operative to subject said bars to their respective latches, in succession, and to trip the latches of next higher decimal order, in succession, of an auxiliary latch trip common to said latches, having an independent trip key, such as a tabulating key, for actuating the same.

51. The combination with a typewriter, of a computer comprising a register, register bars, register bar latches, and a register bar selector operative to subject said bars to their respective latches, in succession, and a latch trip, common to said latches, having an independent trip key, such as a tabulating key, for actuating the same.

52. The combination with a typewriter, of a computer comprising a register, register bars, register bar latches, and a register bar selector operative to subject said bars to their respective latches, in succession, and to trip the latches of next higher decimal order, in succession, an auxiliary latch trip, and a tabulating key having connections for actuating said auxiliary trip and for releasing the typewriter carriage from its controlling escapement mechanism.

53. In a computer, the combination with a register, of register bars having unit pins, key-actuated means for setting said unit pins, means coöperating with the set unit pins to cause said register bars to actuate said register, a spring-power actuated register-bar selector, operative to subject said bars to their respective latches, in succession, and to trip the latches of next higher order, in succession, and an auxiliary latch trip having an independent trip key, such as a tabulating key, for actuating the same.

54. In a computer, the combination with a register, of decimal order register actuators having preliminary representation elements, key-controlled means for setting said preliminary representation elements, a decimal order selector operative, in succession, on said register actuators, to move the same into position for the setting of their preliminary representation elements, and a key-actuated trip for insuring return movements to said register actuators, in advance of the action of said selector on said actuators of next lower order.

55. In a computer, the combination with a register, of register bars having key set unit pins, register bar latches operative to hold said bars in position for the setting of their unit pins, a register bar selector operative to subject said bars to their respective latches, in succession, means for tripping the latches of next higher decimal order, in succession, an operating carriage coöperating with the set unit pins to cause said register bars to actuate said register, an auxiliary latch trip common to said latches, and a connection whereby the initial movement of said operating carriage actuates said auxiliary latch trip.

56. In a computer, the combination with a register, of register bars having key set unit pins, register bar latches operative to hold said bars in position for the setting of their pins, a register bar selector operative to subject said bars to their respective latches, in succession, a trip common to said latches, an operating carriage coöperating with the set unit pins, to cause said register bars to actuate said register, and a connection whereby the initial movement of said carriage actuates said latch trip.

57. In a computer, the combination with a register, of register bars having key set unit pins, register bar latches operative to hold said bars in position for the setting of their unit pins, a register bar selector operative to subject said bars to their respective latches, in succession, and to trip the latches of next higher decimal order, in succession, an auxiliary trip common to said latches, an operating carriage coöperating with the set unit pins, to cause said register bars to actuate said register, and a connection whereby the initial movement of said operating carriage actuates said auxiliary latch trip.

58. In a computer, the combination with a register, of register bars having key set unit pins, register bar latches for holding the said register bars in position for the setting of their unit pins, a register bar selector operative to subject said register bars to their respective latches, in succession, means for tripping the latches of next higher decimal order, in succession, an auxiliary latch trip common to said latches, key connections to said auxiliary latch trip, for actuating the same in advance of the movement of said selector, an operating carriage coöperating with the set unit pins, for causing the register bars to actuate said register, and a connection whereby the initial movement of said operating carriage will actuate said auxiliary latch trip.

59. In a computer, the combination with a register, register bars, register bar latches, and register bar lifting levers, of a register bar selector operative on said lifting levers, to subject said bars to their respective latches, a latch trip common to said latches, and means for simultaneously actuating said latch trip and for throwing said lifting levers and selector out of operative zones of action in respect to each other.

60. In a computer, the combination with a register, register bars having unit pins, register bar latches, register bar lifting levers, and a register bar selector operative on said lifting levers, to subject said bars to their respective latches, in succession, of an operating carriage coöperating with the set unit pins, to cause said register bars to actuate said register, a latch trip common to said latches, and means whereby the initial movement of said operating carriage operates said latch trip and throws said lifting levers and selector out of coöperative zones of action with respect to each other.

61. In a printing and computing machine, the combination with computing mechanism and a paper-supporting carriage, of a manually operated device for the computing mechanism, a connection whereby said operating member will return said paper carriage, and means for preventing return movements of said paper carriage while said operating member is in idle or normal position.

62. The combination with a typewriter, of a computer comprising a register, key-set preliminary representation devices, a manually operated device having connections for causing the set preliminary representation devices to actuate said register, a connection whereby said manually operated device will return the typewriter carriage, and means for preventing return movements of the typewriter carriage while said manually operated device is in normal or idle position.

63. The combination with a typewriter, of a computer, comprising a register, register-actuating preliminary representation devices, key-controlled means for setting said preliminary representation devices, including a decimal order selector arranged to be moved when the typewriter carriage is moved, a manually operated device having connections for causing the set preliminary representation devices to actuate said register, and for effecting return movements of the typewriter carriage and said selector, and means for preventing return movements of the typewriter carriage and selector while said manually operated device is in normal or idle position.

64. The combination with a typewriter, of a computer, comprising a register, register bars having key-set unit pins, a power-driven register bar selector, arranged to move when the typewriter carriage is moved, a manually controlled operating carriage coöperating with the set unit pins, to cause said register bars to actuate said register, a connection whereby a movement of said operating carriage and its lever effects return movements of the typewriter carriage and of said selector, and means for preventing return movements of the typewriter carriage and selector while said operating carriage is in normal or idle position.

65. In a computer, the combination with a register, register bars having key-set unit pins, register bar latches, and a register bar selector operative to subject said bars to their respective latches, in succession, of an operating carriage coöperating with the set unit pins, to cause said register bars to actuate said register, a latch trip common to said latches, a lock preventing return movements of said selector while said operating carriage is in normal or idle position, and means whereby said latch trip will be actuated and said lock will be moved into a releasing position, when said operating carriage is moved from its normal or idle position.

66. In a computer, the combination with a register, of register bars having key-set unit pins, register bar latches, register bar lifting levers, a key-controlled register bar selector operative on said lifting levers, to subject said register bars to their respective latches, in succession, an operating carriage coöperating with the set unit pins, to cause said register bars to operate said register, connections whereby a movement of said operating carriage effects a return movement of said selector, a lock preventing return movements of said selector while said operating carriage is in normal or idle position, and means whereby said lock will be moved into a releasing position, and said lifting levers will be moved out of the zone of operation of said selector, when said operating carriage is moved from its normal or idle position.

67. In a writing and computing machine, the combination with a carriage having a step-by-step movement, and devices for feeding the paper thereon, of an operating lever, flexible connections between said carriage and operating lever, and take-up mechanism for taking up the slack in said flexible connections, when the carriage is returned independently of the operating lever.

68. In a writing and computing machine, the combination with a carriage having a step-by-step movement, and devices for feeding the paper thereon, of an operating lever, flexible connections between said lever and said devices for feeding the paper, and a take-up mechanism for taking up the slack in the flexible connections, when the paper is fed through the manipulation of the paper feeding devices independently of the operating lever.

69. In a writing and computing machine, the combination with a carriage having a step-by-step movement, and paper feeding devices thereon, of an operating lever, flexible connections between said lever and said paper feeding devices, whereby the paper may be fed for line spacing and the carriage returned for the writing of a new line through a single operation of the operating lever, and take-up mechanism to take up the slack in the flexible connections when the carriage is returned or the paper-feeding devices are manipulated for feeding the paper, independently of the operating lever.

70. In a writing and computing machine, the combination with a carriage having a step-by-step movement for letter spacing, and paper feeding devices thereon, of an operating lever, connections between said lever and said paper feeding devices adapted to be variably intercepted by said lever, to feed the paper for line spacing and return the carriage to different predetermined positions.

71. In a writing and computing machine, the combination with a carriage having a step-by-step movement, and paper feeding devices thereon, of an operating lever, flexible connections between said operating lever and the paper feeding devices, and a take-up mechanism adapted to be variably intercepted by the operating lever, for feeding the paper and for returning the carriage to different predetermined positions.

72. In a writing and computing machine, the combination with a carriage having a step-by-step movement, and paper feeding devices thereon, of an operating lever, a take-up mechanism having means for being variably set for differential coupling with the operating lever, and connections between said take-up mechanism and paper-feeding devices whereby the paper may be fed for line spacing and the carriage returned to different predetermined positions.

73. In a writing and computing machine, the combination with a carriage having a step-by-step movement, and paper feeding devices thereon, of an operating lever, connections between said lever and paper feeding devices, and means carried by said operating lever for establishing an operative connection between said lever and the paper-feeding devices, at will, for operating the paper-feeding devices and returning the carriage, or letting them remain idle during repeated operations of the lever, as in multiplication.

74. In a writing and computing machine, the combination with an operating lever, of a carriage having a step-by-step movement, flexible means, such as a cord or the like, a spring-actuated take up sheave on which to coil said flexible means, and means for differentially coupling said sheave with the operating lever.

75. In a writing and computing machine, the combination with an operating lever, of a frictionally-held driving bar on said lever, and take-up mechanism, consisting of a differential spring-actuated coupling, and a sheave actuated by said coupling.

76. In a computer, the combination with a register, of register bars having unit pins, register bar latches, register bar lifting levers, a rocking support for said lifting levers, a rotary register bar selector operative on said lifting levers, to subject said register bars to their respective latches, in succession, and an operating carriage coöperating with the set unit pins, to cause said register bars to actuate said register, and to be positively operative on said rocking lever-support, under its initial movement, to move said lifting levers out of the zone of operation of said selector.

77. In a computer, the combination with a register and keys, of register actuating elements adapted to be variably adjusted for differential action on the register, a primary source of power, power transmitting devices exerting intermittent force on the register actuating elements, for positioning the same to the keys, in succession, and a secondary source of power constantly exerting force on said register actuating elements, tending, but not quite sufficient, to cause any movements thereof, thereby minimizing the power required from the primary source.

78. In a computer, the combination with a register, of register bars having key-set unit pins, a key-controlled register bar selector for moving said bars, in succession, into position for the setting of their unit pins, and springs acting on said bars with a force that tends but is less than sufficient to move the same into their said pin-setting positions, thereby minimizing the required power of said selector.

79. In a computer, the combination with a register and keys, of register bars, means for positioning said bars, in succession, to the action of the keys, latches coöperating with the register bars, means for tripping the latches from their register bar supporting positions, and a series of springs overlying the register bars, for reinforcing the action of gravity in returning said bars to their normal positions.

80. In a combined printing and computing machine, the combination with keys controlling the printing mechanism, of keys controlling the computing mechanism, said two classes of keys being mounted to move on intersecting lines, and constructed to a. rectly interlock, for insuring synchronous actions thereof.

81. In a combined printing and computing machine, the combination with keys controlling the printing mechanism, of keys controlling the computing mechanism, the printing keys being capable of movements independent of the computer keys, and said computer keys being arranged to actuate corresponding printing keys, said two classes of keys being mounted to move on intersecting lines, and constructed to directly interlock, for insuring synchronous actions thereof.

82. The combination with a multiplying controller, and means for moving the same to select the denominational orders, of a position indicator showing the positions of the multiplying controller relative to the denominational orders of the register.

83. In a computer, the combination with a register and register controlling devices, of a series of indicating rods subject to said controlling devices, and serving to indicate the decimal order on which said controlling devices are in position to operate.

84. In a computer, the combination with a register, register bars, register bar latches, and a register bar selector operative to subject said register bars to their respective latches, in succession, of a series of indicating rods connected to said latches, and arranged to be projected thereby, in the vicinity of corresponding wheels of said register, to indicate the decimal order on which said selector was last operative.

85. In a computer, the combination with a register, of register bars having unit pins, means coöperating with the set unit pins for causing said register bars to actuate said register, and an error-correcting device arranged to restore all of the set unit pins of the several bars to normal positions, by a single action.

86. In a computer, the combination with a register, of register bars having unit pins, register bar latches, a register bar selector operative to subject said bars to their respective latches, in succession, and an error-correcting device operative to release any set bar from its latch, and to restore the set unit pins to normal positions.

87. In a computer, the combination with a register, of register bars having key-set unit pins, register bar latches, a register bar selector operative to subject said bars to their respective latches, in succession, and an error-correcting device comprising a latch-tripping bail and a unit pin restoring plate, the two being connected for simultaneous movements, substantially as and for the purposes set forth.

88. In a computer, the combination with operating devices, of an interchangeable denominational order selector, interlocking means for coupling said selector to its operating devices, and automatically adjustable means for holding said selector securely coupled to its operating devices, and permitting its easy removal and replacement.

89. In a computer, the combination with register wheels, of multiplier-indicator wheels, a rotatable shaft on which both sets of said wheels are mounted, a device for rotating said shaft, at will, and means whereby the rotation of said shaft in one direction will reset all of the said two classes of wheels, substantially as described.

In testimony whereof I affix my signature in presence of two witnesses.

HANS HANSON.

Witnesses:
ROBERT C. MABEY,
F. D. MERCHANT.